US008818887B2

(12) United States Patent
Ahlers et al.

(10) Patent No.: US 8,818,887 B2
(45) Date of Patent: Aug. 26, 2014

(54) COMPUTER-IMPLEMENTED METHODS, PROGRAM PRODUCT, AND SYSTEM FOR MICRO-LOAN PRODUCT MANAGEMENT

(75) Inventors: Rebecca Ahlers, Cincinnati, OH (US); Eric Miller, San Mateo, CA (US); Scott Galit, New York, NY (US); Trent Sorbe, Brookings, SD (US); Troy Larson, Brandon, SD (US)

(73) Assignee: Metabank, Sioux Falls, SD (US)

( * ) Notice: Subject to any disclaimer, the term of this patent is extended or adjusted under 35 U.S.C. 154(b) by 355 days.

(21) Appl. No.: 12/338,684

(22) Filed: Dec. 18, 2008

(65) Prior Publication Data
US 2009/0164363 A1    Jun. 25, 2009

Related U.S. Application Data

(60) Provisional application No. 61/016,213, filed on Dec. 21, 2007, provisional application No. 61/052,454, filed on May 12, 2008, provisional application No. 61/029,975, filed on Feb. 20, 2008, provisional application No. 61/042,612, filed on Apr. 4, 2008, provisional application No. 61/042,624, filed on Apr. 4, 2008, provisional application No. 61/032,750, filed on Feb. 29, 2008, provisional application No. 61/060,559, filed on Jun. 11, 2008, provisional application No. 61/082,863, filed on Jul. 23, 2008, provisional application No. 61/053,056, filed on May 14, 2008.

(51) Int. Cl.
| | |
|---|---|
| *G06Q 40/00* | (2012.01) |
| *G06Q 20/10* | (2012.01) |
| *G06Q 40/02* | (2012.01) |
| *G06Q 20/40* | (2012.01) |
| *G06Q 20/20* | (2012.01) |

(52) U.S. Cl.
CPC .............. *G06Q 40/02* (2013.01); *G06Q 20/108* (2013.01); *G06Q 20/105* (2013.01); *G06Q 40/025* (2013.01); *G06Q 20/40* (2013.01); *G06Q 20/20* (2013.01); *G06Q 40/00* (2013.01); *G06Q 20/10* (2013.01)
USPC ......................................................... 705/35

(58) Field of Classification Search
USPC ............................................................ 705/35
See application file for complete search history.

(56) References Cited

U.S. PATENT DOCUMENTS

| | | | |
|---|---|---|---|
| 3,752,904 | A | 8/1973 | Waterbury |
| 4,247,759 | A | 1/1981 | Yuris et al. |

(Continued)

FOREIGN PATENT DOCUMENTS

| | | |
|---|---|---|
| EP | 0348932 | 1/1990 |
| EP | 0397512 | 11/1990 |

(Continued)

OTHER PUBLICATIONS

Lazarus, David, "120% rate for Wells' advances", Oct. 6, 2004, San Francisco Chronicle.*

(Continued)

*Primary Examiner* — Eric T Wong
(74) *Attorney, Agent, or Firm* — Bracewell & Giuliani LLP

(57) ABSTRACT

Embodiments of the present invention include methods, program product and systems for card and bank product management. An embodiment of a method of advancing funds to a banking customer, for example, includes establishing a line of credit with a bank through an on-line access interface with the bank, determining whether access to funds through the line of credit should occur for a customer transaction and providing one or more preselected increments of funds for the customer transaction. A cumulative amount of the one or more preselected increments, for example, can be less than a total available line of credit for a customer having an established line of credit with the bank. The method further includes decrementing the total available line of credit by the cumulative amount of the one or more preselected increments provided for the customer transaction and a predetermined fee amount for each preselected increment of funds.

20 Claims, 12 Drawing Sheets

(56) References Cited

U.S. PATENT DOCUMENTS

| | | |
|---|---|---|
| 4,334,307 A | 6/1982 | Bourgeois et al. |
| 4,439,636 A | 3/1984 | Newkirk et al. |
| 4,449,040 A | 5/1984 | Matsuoka et al. |
| 4,528,643 A | 7/1985 | Freeny, Jr. |
| 4,532,416 A | 7/1985 | Berstein |
| 4,577,061 A | 3/1986 | Katzeff et al. |
| 4,625,276 A | 11/1986 | Benton et al. |
| 4,677,565 A | 6/1987 | Ogaki et al. |
| 4,678,895 A | 7/1987 | Tateisi et al. |
| 4,706,275 A | 11/1987 | Kamil |
| 4,722,054 A | 1/1988 | Yorozu et al. |
| 4,727,243 A | 2/1988 | Savar |
| 4,750,201 A | 6/1988 | Hodgson et al. |
| 4,797,540 A | 1/1989 | Kimizu |
| 4,827,113 A | 5/1989 | Rikuna |
| 4,868,900 A | 9/1989 | McGuire |
| 4,877,947 A | 10/1989 | Mori |
| 4,879,744 A | 11/1989 | Tasaki et al. |
| 4,884,212 A | 11/1989 | Stutsman |
| 4,951,308 A | 8/1990 | Bishop et al. |
| 4,968,873 A | 11/1990 | Dethloff et al. |
| 5,012,077 A | 4/1991 | Takano |
| 5,048,085 A | 9/1991 | Abraham et al. |
| 5,050,207 A | 9/1991 | Hitchcock |
| 5,068,891 A | 11/1991 | Marshall |
| 5,101,098 A | 3/1992 | Naito |
| 5,138,650 A | 8/1992 | Stahl et al. |
| 5,146,067 A | 9/1992 | Sloan et al. |
| 5,148,481 A | 9/1992 | Abraham et al. |
| 5,155,342 A | 10/1992 | Urano |
| 5,163,086 A | 11/1992 | Ahearn et al. |
| 5,192,947 A | 3/1993 | Neustein |
| 5,220,593 A | 6/1993 | Zicker et al. |
| 5,221,838 A | 6/1993 | Gutman et al. |
| 5,225,666 A | 7/1993 | Amarena et al. |
| 5,264,689 A | 11/1993 | Maes et al. |
| 5,265,155 A | 11/1993 | Castro |
| 5,266,782 A | 11/1993 | Alanara et al. |
| 5,272,320 A | 12/1993 | Hakamada |
| 5,278,752 A | 1/1994 | Narita et al. |
| 5,285,382 A | 2/1994 | Muehlberger et al. |
| 5,327,482 A | 7/1994 | Yamamoto |
| 5,334,821 A | 8/1994 | Campo et al. |
| 5,340,969 A | 8/1994 | Cox |
| 5,352,876 A | 10/1994 | Watanabe et al. |
| 5,359,182 A | 10/1994 | Schilling |
| 5,409,092 A | 4/1995 | Itako et al. |
| 5,416,306 A | 5/1995 | Imahata |
| 5,438,186 A | 8/1995 | Nair et al. |
| 5,442,567 A | 8/1995 | Small |
| 5,448,044 A | 9/1995 | Price et al. |
| 5,465,206 A | 11/1995 | Hilt et al. |
| 5,477,038 A | 12/1995 | Levine et al. |
| 5,504,808 A | 4/1996 | Hamrick, Jr. |
| 5,511,114 A | 4/1996 | Stimson et al. |
| 5,513,117 A | 4/1996 | Small |
| 5,550,358 A | 8/1996 | Tait et al. |
| 5,577,109 A | 11/1996 | Stimson et al. |
| 5,577,121 A | 11/1996 | Davis et al. |
| 5,661,254 A | 8/1997 | Steuer et al. |
| 5,696,908 A | 12/1997 | Muehlberger et al. |
| 5,699,528 A | 12/1997 | Hogan |
| 5,732,136 A | 3/1998 | Murphree et al. |
| 5,814,798 A | 9/1998 | Zancho |
| 5,841,365 A | 11/1998 | Rimkus |
| 5,859,419 A | 1/1999 | Wynn |
| 5,870,721 A | 2/1999 | Norris |
| 5,875,437 A | 2/1999 | Atkins |
| 5,878,141 A | 3/1999 | Daly et al. |
| 5,893,907 A | 4/1999 | Ukuda |
| 5,897,620 A | 4/1999 | Walker et al. |
| 5,920,848 A | 7/1999 | Schutzer et al. |
| 5,923,016 A | 7/1999 | Fredregill et al. |
| 5,933,812 A | 8/1999 | Meyer et al. |
| 5,963,921 A | 10/1999 | Longfield |
| 6,000,608 A | 12/1999 | Dorf |
| 6,012,635 A | 1/2000 | Shimada et al. |
| 6,021,397 A | 2/2000 | Jones et al. |
| 6,032,859 A | 3/2000 | Muehlberger et al. |
| 6,041,308 A | 3/2000 | Walker et al. |
| 6,065,679 A | 5/2000 | Levie et al. |
| 6,112,191 A | 8/2000 | Burke |
| 6,144,948 A | 11/2000 | Walker et al. |
| 6,154,738 A | 11/2000 | Call |
| 6,189,787 B1 | 2/2001 | Dorf |
| 6,208,978 B1 | 3/2001 | Walker et al. |
| 6,249,773 B1 | 6/2001 | Allard et al. |
| 6,253,998 B1 | 7/2001 | Ziarno |
| 6,304,860 B1 | 10/2001 | Martin et al. |
| 6,315,193 B1 | 11/2001 | Hogan |
| 6,450,407 B1 | 9/2002 | Freeman et al. |
| 6,467,684 B2 | 10/2002 | Fite et al. |
| 6,704,714 B1 | 3/2004 | O'Leary et al. |
| 6,739,506 B1 | 5/2004 | Constantine |
| 6,865,544 B1 | 3/2005 | Austin |
| 6,920,434 B1 | 7/2005 | Cossette |
| 6,999,943 B1 | 2/2006 | Johnson et al. |
| 7,010,507 B1 | 3/2006 | Anderson et al. |
| 7,031,939 B1 | 4/2006 | Gallagher et al. |
| 7,072,862 B1 | 7/2006 | Wilson |
| 7,127,452 B1 | 10/2006 | Yashiro |
| 7,177,829 B1 | 2/2007 | Wilson et al. |
| 7,206,761 B2 | 4/2007 | Colvin |
| 7,252,223 B2 | 8/2007 | Schofield |
| 7,258,273 B2 | 8/2007 | Griffin |
| 7,370,076 B2 | 5/2008 | Friedman et al. |
| 7,392,224 B1 | 6/2008 | Bauer et al. |
| 7,398,919 B2 | 7/2008 | Cooper |
| 7,426,492 B1 | 9/2008 | Bishop et al. |
| 7,451,920 B1 | 11/2008 | Rose |
| 7,472,089 B2 | 12/2008 | Hu et al. |
| 7,493,279 B1 | 2/2009 | Kwan |
| 7,509,286 B1 | 3/2009 | Bent et al. |
| 7,546,945 B1 | 6/2009 | Bucci et al. |
| 7,567,936 B1 | 7/2009 | Peckover et al. |
| 7,599,879 B2 | 10/2009 | Louie et al. |
| 7,606,918 B2 | 10/2009 | Holzman et al. |
| 7,607,570 B1 | 10/2009 | Constantine |
| 7,628,319 B2 | 12/2009 | Brown et al. |
| 7,653,591 B1 | 1/2010 | Dabney |
| 7,702,583 B1 | 4/2010 | Hamilton et al. |
| 7,702,587 B2 | 4/2010 | Nguyen et al. |
| 7,752,102 B2 | 7/2010 | Thomas |
| 7,757,944 B2 | 7/2010 | Cline et al. |
| 7,783,571 B2 | 8/2010 | Fish et al. |
| 7,792,717 B1 | 9/2010 | Hankins et al. |
| 7,810,735 B2 | 10/2010 | Madani |
| 7,813,955 B2 | 10/2010 | Ariff et al. |
| 7,814,012 B2 | 10/2010 | Johnson |
| 7,856,399 B2 | 12/2010 | Wilkes |
| 7,865,434 B2 | 1/2011 | Sheets |
| 7,873,569 B1 | 1/2011 | Cahn |
| 7,899,750 B1 | 3/2011 | Klieman et al. |
| 7,904,333 B1 | 3/2011 | Perkowski |
| 7,933,833 B2 | 4/2011 | Hotz et al. |
| 7,954,704 B1 | 6/2011 | Gephart et al. |
| 8,024,242 B2 | 9/2011 | Galit |
| 8,046,256 B2 | 10/2011 | Chien et al. |
| 8,051,006 B1 | 11/2011 | Rourk |
| 8,055,557 B2 | 11/2011 | Sorbe et al. |
| 8,065,187 B2 | 11/2011 | Ahlers et al. |
| 8,069,085 B2 | 11/2011 | Ahlers et al. |
| 8,086,494 B2 | 12/2011 | Dooley et al. |
| 8,090,649 B2 | 1/2012 | Galit et al. |
| 8,103,549 B1 | 1/2012 | Ahlers et al. |
| 8,108,272 B2 | 1/2012 | Sorbe et al. |
| 8,108,279 B2 | 1/2012 | Galit et al. |
| 8,108,977 B1 | 2/2012 | Miller |
| 8,150,764 B2 | 4/2012 | Crowe et al. |
| 8,175,962 B2 | 5/2012 | Galit et al. |
| 8,175,972 B2 | 5/2012 | Galit et al. |
| 8,190,480 B1 | 5/2012 | Ahlers et al. |
| 8,214,286 B1 | 7/2012 | Galit et al. |
| 8,244,611 B2 | 8/2012 | Galit |

(56) References Cited

U.S. PATENT DOCUMENTS

| | | |
|---|---|---|
| 8,244,637 B2 | 8/2012 | Galit et al. |
| 8,260,678 B2 | 9/2012 | Miller |
| 8,266,047 B2 | 9/2012 | Galit |
| 8,286,863 B1 | 10/2012 | Brooks |
| 8,290,853 B2 | 10/2012 | Galit |
| 8,296,227 B2 | 10/2012 | Galit et al. |
| 8,301,557 B1 | 10/2012 | Crowe et al. |
| 8,306,912 B2 | 11/2012 | Galit |
| 8,341,021 B2 | 12/2012 | Ahlers et al. |
| 8,355,984 B1 | 1/2013 | Galit et al. |
| 8,371,502 B1 | 2/2013 | Galit et al. |
| 8,386,375 B2 | 2/2013 | Galit |
| 8,392,299 B2 | 3/2013 | Sorbe et al. |
| 8,392,330 B2 | 3/2013 | Sorbe et al. |
| 8,403,211 B2 | 3/2013 | Brooks et al. |
| 8,485,441 B2 | 7/2013 | Brooks |
| 8,494,960 B2 | 7/2013 | Galit et al. |
| 8,538,879 B2 | 9/2013 | Galit et al. |
| 8,589,295 B2 | 11/2013 | Sorbe et al. |
| 2001/0021925 A1 | 9/2001 | Ukigawa et al. |
| 2001/0034663 A1 | 10/2001 | Teveler et al. |
| 2001/0034676 A1 | 10/2001 | Vasic |
| 2001/0042785 A1 | 11/2001 | Walker et al. |
| 2002/0002075 A1 | 1/2002 | Rowe |
| 2002/0032612 A1 | 3/2002 | Williams et al. |
| 2002/0038285 A1 | 3/2002 | Golden et al. |
| 2002/0042744 A1 | 4/2002 | Kohl |
| 2002/0055904 A1 | 5/2002 | Mon |
| 2002/0055909 A1 | 5/2002 | Fung et al. |
| 2002/0077971 A1 | 6/2002 | Allred |
| 2002/0107797 A1 | 8/2002 | Combaluzier |
| 2002/0111886 A1 | 8/2002 | Chenevich et al. |
| 2002/0138415 A1 | 9/2002 | Siska |
| 2002/0152161 A1 | 10/2002 | Aoike |
| 2002/0194122 A1 | 12/2002 | Knox et al. |
| 2002/0194124 A1 | 12/2002 | Hobbs et al. |
| 2003/0001005 A1 | 1/2003 | Risafi et al. |
| 2003/0004997 A1 | 1/2003 | Parker et al. |
| 2003/0055782 A1 | 3/2003 | Slater |
| 2003/0061170 A1 | 3/2003 | Uzo |
| 2003/0074311 A1 | 4/2003 | Saylors et al. |
| 2003/0097331 A1 | 5/2003 | Cohen |
| 2003/0135459 A1 | 7/2003 | Abelman et al. |
| 2003/0144935 A1 | 7/2003 | Sobek |
| 2003/0158811 A1 | 8/2003 | Sanders et al. |
| 2003/0167225 A1 | 9/2003 | Adams |
| 2003/0191702 A1 | 10/2003 | Hurley |
| 2003/0191714 A1 | 10/2003 | Norris |
| 2003/0197059 A1 | 10/2003 | Tidball et al. |
| 2003/0200118 A1 | 10/2003 | Lee et al. |
| 2003/0208443 A1 | 11/2003 | Mersky |
| 2003/0217003 A1 | 11/2003 | Weinflash et al. |
| 2004/0036215 A1* | 2/2004 | Butler, II ................ 273/243 |
| 2004/0047459 A1 | 3/2004 | Diaz |
| 2004/0098351 A1 | 5/2004 | Duke |
| 2004/0111370 A1 | 6/2004 | Saylors et al. |
| 2004/0117250 A1 | 6/2004 | Lubow et al. |
| 2004/0117302 A1 | 6/2004 | Weichert et al. |
| 2004/0133515 A1 | 7/2004 | McCoy et al. |
| 2004/0143527 A1 | 7/2004 | Benkert et al. |
| 2004/0148252 A1 | 7/2004 | Fleishman |
| 2004/0153407 A1 | 8/2004 | Clubb et al. |
| 2004/0199463 A1 | 10/2004 | Deggendorf |
| 2004/0210484 A1 | 10/2004 | Lee |
| 2004/0211830 A1 | 10/2004 | Algiene |
| 2004/0215554 A1 | 10/2004 | Kemper et al. |
| 2004/0225545 A1 | 11/2004 | Turner et al. |
| 2004/0230523 A1 | 11/2004 | Johnson |
| 2004/0235542 A1 | 11/2004 | Stronach et al. |
| 2004/0236646 A1 | 11/2004 | Wu et al. |
| 2005/0004839 A1 | 1/2005 | Bakker et al. |
| 2005/0015332 A1 | 1/2005 | Chen |
| 2005/0021363 A1 | 1/2005 | Stimson et al. |
| 2005/0071230 A1 | 3/2005 | Mankoff |
| 2005/0075939 A1 | 4/2005 | Bao et al. |
| 2005/0082364 A1 | 4/2005 | Alvarez et al. |
| 2005/0108121 A1 | 5/2005 | Gravett et al. |
| 2005/0167481 A1 | 8/2005 | Hansen et al. |
| 2005/0167487 A1 | 8/2005 | Conlon et al. |
| 2005/0173520 A1* | 8/2005 | Jaros et al. ............... 235/381 |
| 2005/0177489 A1 | 8/2005 | Neff et al. |
| 2005/0177502 A1 | 8/2005 | Thomas |
| 2005/0203837 A1 | 9/2005 | Leigh et al. |
| 2005/0205663 A1 | 9/2005 | Allgiene |
| 2005/0228724 A1 | 10/2005 | Frangiosa |
| 2005/0278188 A1 | 12/2005 | Thomson et al. |
| 2005/0278347 A1 | 12/2005 | Wolf et al. |
| 2005/0283436 A1 | 12/2005 | Greer et al. |
| 2005/0289044 A1 | 12/2005 | Breslin et al. |
| 2006/0059085 A1 | 3/2006 | Tucker |
| 2006/0085269 A1 | 4/2006 | Guilfoyle |
| 2006/0085334 A1 | 4/2006 | Murphy |
| 2006/0149665 A1 | 7/2006 | Weksler |
| 2006/0149670 A1 | 7/2006 | Nguyen et al. |
| 2006/0161499 A1 | 7/2006 | Rich et al. |
| 2006/0169784 A1 | 8/2006 | Collins et al. |
| 2006/0190322 A1 | 8/2006 | Oehlerking et al. |
| 2006/0206402 A1 | 9/2006 | Sullivan |
| 2006/0212392 A1 | 9/2006 | Brown |
| 2006/0212393 A1 | 9/2006 | Lindsay Brown |
| 2006/0224502 A1 | 10/2006 | McGowan |
| 2006/0249570 A1 | 11/2006 | Seifert et al. |
| 2006/0249870 A1 | 11/2006 | Tachauer |
| 2006/0259364 A1 | 11/2006 | Strock et al. |
| 2006/0259957 A1 | 11/2006 | Tam et al. |
| 2006/0282356 A1 | 12/2006 | Andres et al. |
| 2006/0282374 A1* | 12/2006 | Stone ......................... 705/38 |
| 2006/0293966 A1 | 12/2006 | Inouye |
| 2007/0000997 A1 | 1/2007 | Lambert et al. |
| 2007/0011089 A1 | 1/2007 | DeSchryver |
| 2007/0038515 A1 | 2/2007 | Postrel |
| 2007/0038924 A1 | 2/2007 | Beyer et al. |
| 2007/0045401 A1 | 3/2007 | Sturm |
| 2007/0061206 A1 | 3/2007 | LeFebvre |
| 2007/0083462 A1 | 4/2007 | Cubillo et al. |
| 2007/0087819 A1 | 4/2007 | Van Luchene et al. |
| 2007/0090183 A1 | 4/2007 | Hursta et al. |
| 2007/0100745 A1 | 5/2007 | Keiser |
| 2007/0100746 A1 | 5/2007 | Blair et al. |
| 2007/0100748 A1 | 5/2007 | Dheer et al. |
| 2007/0106603 A1 | 5/2007 | Whyte et al. |
| 2007/0136194 A1 | 6/2007 | Sloan |
| 2007/0152038 A1 | 7/2007 | Ciancio et al. |
| 2007/0168265 A1 | 7/2007 | Rosenberger |
| 2007/0174189 A1 | 7/2007 | Bishop et al. |
| 2007/0175982 A1 | 8/2007 | Bonalle et al. |
| 2007/0175984 A1 | 8/2007 | Khandaker et al. |
| 2007/0198352 A1 | 8/2007 | Kannegiesser |
| 2007/0198354 A1 | 8/2007 | Senghore et al. |
| 2007/0198403 A1 | 8/2007 | Aloni et al. |
| 2007/0233596 A1 | 10/2007 | Ambrose |
| 2007/0244778 A1* | 10/2007 | Bailard ........................ 705/35 |
| 2007/0250380 A1 | 10/2007 | Mankoff |
| 2007/0260536 A1 | 11/2007 | Stone |
| 2007/0262140 A1 | 11/2007 | Long, Sr. |
| 2007/0265957 A1 | 11/2007 | Advani et al. |
| 2007/0265960 A1 | 11/2007 | Advani et al. |
| 2007/0267479 A1 | 11/2007 | Nix et al. |
| 2007/0271178 A1 | 11/2007 | Davis et al. |
| 2007/0276736 A1 | 11/2007 | Guilfoyle |
| 2007/0282740 A1 | 12/2007 | Wendt |
| 2008/0005005 A1* | 1/2008 | Davis et al. .................. 705/35 |
| 2008/0021772 A1 | 1/2008 | Aloni et al. |
| 2008/0040261 A1 | 2/2008 | Nix et al. |
| 2008/0040265 A1 | 2/2008 | Rackley, III et al. |
| 2008/0052189 A1 | 2/2008 | Walker et al. |
| 2008/0052224 A1 | 2/2008 | Parker |
| 2008/0059363 A1 | 3/2008 | Hotz et al. |
| 2008/0065532 A1 | 3/2008 | De La Motte |
| 2008/0091519 A1 | 4/2008 | Foss |
| 2008/0103968 A1 | 5/2008 | Bies et al. |
| 2008/0103970 A1 | 5/2008 | Books et al. |
| 2008/0120129 A1 | 5/2008 | Seubert et al. |
| 2008/0140561 A1 | 6/2008 | Neel |

(56) References Cited

U.S. PATENT DOCUMENTS

| | | |
|---|---|---|
| 2008/0140568 A1 | 6/2008 | Henry |
| 2008/0162271 A1 | 7/2008 | Benjamin |
| 2008/0162337 A1 | 7/2008 | Greenland et al. |
| 2008/0210753 A1 | 9/2008 | Plozay et al. |
| 2008/0228643 A1 | 9/2008 | Hall |
| 2008/0235095 A1 | 9/2008 | Oles et al. |
| 2008/0270298 A1 | 10/2008 | McElroy et al. |
| 2008/0281734 A1 | 11/2008 | Longe et al. |
| 2008/0294977 A1 | 11/2008 | Friedman et al. |
| 2008/0301162 A1 | 12/2008 | Wall et al. |
| 2009/0006203 A1 | 1/2009 | Fordyce, III et al. |
| 2009/0048963 A1 | 2/2009 | Bishop et al. |
| 2009/0061929 A1 | 3/2009 | Evans |
| 2009/0063297 A1 | 3/2009 | Dooley et al. |
| 2009/0063342 A1 | 3/2009 | Beckers |
| 2009/0063351 A1 | 3/2009 | Schmeyer et al. |
| 2009/0078757 A1 | 3/2009 | Hanson et al. |
| 2009/0157220 A1 | 6/2009 | Walker et al. |
| 2009/0164351 A1 | 6/2009 | Sorbe et al. |
| 2009/0164362 A1 | 6/2009 | Moore |
| 2009/0164363 A1 | 6/2009 | Ahlers |
| 2009/0171775 A1 | 7/2009 | Cashion et al. |
| 2009/0192934 A1 | 7/2009 | Chu et al. |
| 2009/0222367 A1 | 9/2009 | Jenkins et al. |
| 2009/0228307 A1 | 9/2009 | Sorbe |
| 2009/0254431 A1 | 10/2009 | Crowe et al. |
| 2010/0030687 A1 | 2/2010 | Panthaki et al. |
| 2010/0057554 A1 | 3/2010 | Lanford |
| 2010/0057609 A1 | 3/2010 | Sibson |
| 2010/0076836 A1 | 3/2010 | Giordano et al. |
| 2010/0076875 A1 | 3/2010 | Ernst et al. |
| 2010/0106555 A1 | 4/2010 | Mneimneh et al. |
| 2010/0222132 A1* | 9/2010 | Sanford et al. ................ 463/25 |
| 2010/0280949 A1 | 11/2010 | Van Rensburg |
| 2010/0306104 A1 | 12/2010 | Johnson |
| 2010/0312684 A1 | 12/2010 | Kemper et al. |
| 2011/0047039 A1 | 2/2011 | Crames et al. |
| 2011/0093323 A1 | 4/2011 | Prus et al. |
| 2011/0106698 A1 | 5/2011 | Isaacson et al. |
| 2011/0112957 A1 | 5/2011 | Ingram et al. |
| 2011/0270664 A1 | 11/2011 | Jones |
| 2013/0124429 A1 | 5/2013 | Zou et al. |

FOREIGN PATENT DOCUMENTS

| | | |
|---|---|---|
| EP | 0397512 A2 | 11/1990 |
| EP | 0619565 | 10/1994 |
| EP | 0619565 A1 | 10/1994 |
| EP | 0348932 A2 | 5/1995 |
| JP | 2-238593 | 9/1990 |
| JP | 2-238593 A | 9/1990 |
| JP | 2-278495 | 11/1990 |
| JP | 2-278495 A | 11/1990 |
| JP | 3-100791 | 4/1991 |
| JP | 3-100791 A | 4/1991 |
| JP | 4-165588 | 6/1992 |
| JP | 4-165588 A | 6/1992 |
| KR | 2010010217 | 2/2010 |
| WO | WO 86/02757 A1 | 5/1986 |
| WO | WO8602757 | 5/1986 |
| WO | WO 86/07647 A1 | 12/1986 |
| WO | WO8607647 | 12/1986 |
| WO | WO 88/03297 A1 | 5/1988 |
| WO | WO8803297 | 5/1988 |
| WO | WO 89/08899 A1 | 9/1989 |
| WO | WO8908899 | 9/1989 |
| WO | WO 91/09370 A1 | 6/1991 |
| WO | WO9109370 | 6/1991 |
| WO | WO 93/09515 A1 | 5/1993 |
| WO | WO9309515 | 5/1993 |
| WO | WO 94/10649 A1 | 5/1994 |
| WO | WO9410649 | 5/1994 |
| WO | WO 94/28498 A1 | 12/1994 |
| WO | WO9428498 | 12/1994 |
| WO | WO 95/03570 A2 | 2/1995 |
| WO | WO9503570 | 2/1995 |
| WO | WO 97/46986 A1 | 12/1997 |
| WO | WO9746986 | 12/1997 |
| WO | WO0060487 | 10/2000 |
| WO | WO 2007133315 | 11/2007 |
| WO | 2008102329 A2 | 8/2008 |
| ZA | 200709282 | 10/2007 |

OTHER PUBLICATIONS

International Search Report for PCT/US2009/039495 dated May 18, 2009.
International Search Report for PCT/US2008/087689 dated Jun. 17, 2009.
International Search Report for PCT/US2009/043988 dated Jul. 14, 2009.
International Search Report for PCT/US2009/039492 dated May 14, 2009.
International Search Report dated May 27, 2009 for PCT/US2009/039504 filed Apr. 3, 2009.
International Search Report dated Jun. 8, 2009 for PCTIUS2009/039512 filed Apr. 3, 2009.
International Search Report dated Jun. 30, 2009 for PCT/US2009/043978 filed May 14, 2009.
Office Action dated Jul. 9, 2010 for U.S. Appl. No. 12/338,365.
Office Action dated Jul. 9, 2010 for U.S. Appl. No. 12/338,645.
Jane Boon Pearlstine, Lenders, Borrowers Hook Up Over the Web: Prosper.com and Other Sites Provide Forum for Individual Bidders Willing to Offer Small Loans, Wall Street Journal, May 20, 2006.
United Nations Conference on Trade and Development, E-finance and Small and Medium-Size Enterprises (SMEs) in Developing and Transition Economies, UNCTAD Expert Meeting, Oct. 17, 2001.
Tim Jones, Paradigms lost, RSA Journal, Oct. 2006, pp. 28-31.
Diego Rumiany, Internet Bidding for Microcredit: making it work in the developed world, conceiving it for the developing world, Mar. 2007.
Stefan Heng, Thomas Meyer, and Antje Stobbe, Implications of Web 2.0 for financial institutions: Be a driver, not a passenger, Munich Personal RePEc Archive, Jul. 31, 2007.
Matt Flannery, Kiva and the Birth of Person to Person Microfinance, Innovations, pp. 31-56, Winter & Spring 2007.
Michael K Hulme and Collette Wright, Internet Based Social Lending: Past, Present and Future, Social Futures Observatory, Oct. 2006.
Richard W Coleman, Is the Future of the Microfinance Movement to be Found on the Internet?, International Trade and Finance Association Working Papers 2007.
Amanda Scott and Patrick Towell, The web we weave, Financial World, pp. 12-15, Nov. 2006.
Prosper, Access and Transparency through Person-to-Person Lending, FDIC Advisory Committee on Economic Inclusion, Mar. 28, 2007.
Co-pending U.S. Appl. No. 12/338,365, filed Dec. 18, 2008, titled "Transfer Account Systems, Computer Program Products, and Associated Computer-Implemented Methods".
Co-pending U.S. Appl. No. 12/338,402, filed Dec. 18, 1008, titled "Transfer Account Systems, Computer Program Products, and Associated Computer-Implemented Methods".
Co-pending U.S. Appl. No. 12/338,440, filed Dec. 18, 2008, titled "Transfer Account Systems, Computer Program Products, and Associated Computer-Implemented Methods".
Co-pending U.S. Appl. No. 12/338,712, filed Dec. 18, 2008, titled "Computer-Implemented Methods, Program Product, and System to Enhance Banking Terms Over Time".
Co-pending U.S. Appl. No. 12/338,497, filed Dec. 18, 2008, titled "Private Label Promotion Card System, Program Product, and Associated Computer-Implemented Methods".
Co-pending U.S. Appl. No. 12/338,540, filed Dec. 18, 2008, titled "Private Label Promotion Card System, Program Product, and Associated Computer-Implemented Methods".
Co-pending U.S. Appl. No. 12/338,584, filed Dec. 18, 2008, titled "Transfer Account Systems, Computer Program Products, and Methods to Prioritize Payments from Preselected Bank Accounts".
Co-pending U.S. Appl. No. 12/338,645, filed Dec. 18, 2008, titled

(56) References Cited

OTHER PUBLICATIONS

"Transfer Account Systems, Computer Program Products, and Methods to Prioritize Payments from Preselected Bank Accounts".
Co-pending U.S. Appl. No. 12/607,780, filed Oct. 28, 2009, titled Shopping Center Gift Card Offer Fulfillment Machine, Program Product, and Associated Methods.
Co-pending U.S. Appl. No. 12/609,896, filed Oct. 30, 2009, titled Machine Methods, and Program Product for Electronic Order Entry.
Co-pending U.S. Appl. No. 12/626,349, filed Nov. 25, 2009, titled Machine, Methods, and Program Product for Electronic Inventory Tracking.
International Search Report for PCT/US09/56072 dated Oct. 20, 2009.
Bank Deals—Best Rates and Deals: EverBank's World Currency CDs—My Interview with EverBank's Executive Frank Trotter, http://bankdeals.blogspot.com, Jul. 29, 2007.
Foreign Exchange Market, http://en.wikipedia.org.
Avoid Gift Card Pitfalls, ConsumerReports.org.
VIPGift Receives Investment From Summit Partners and Bridgescale Partners, Nov. 11, 2008, Chattanooga, TN and Palo Alto, CA.
Co-pending U.S. Appl. No. 12/562,331, filed Sep. 18, 2009, titled Computerized Extension Of Credit To Existing Demand Deposit Accounts, Prepaid Cards And Lines Of Credit Based On Expected Tax Refund Proceeds, Associated Systems And Computer Program Products.
International Search Report from co-pending PCT Application No. PCT/US2009/034692 filed Feb. 20, 2009 titled "Methods to Advance Loan Proceeds on Prepaid Cards, Associated Systems and Computer Program Products".
Co-pending U.S. Appl. No. 12/397,113, filed Mar. 3, 2009, titled "Person-to-Person Lending Program Product, System, And Associated Computer-Implemented Methods".
Co-pending U.S. Appl. No. 12/389,749, filed Feb. 20, 2009, titled "Methods to Advance Loan Proceeds On Prepaid Cards, Associated Systems And Computer Program Products".
Co-pending U.S. Appl. No. 12/417,199, filed Apr. 2, 2009, titled "System, Program Product, And Associated Methods to Autodraw For Micro-Credit Attached To A Prepaid Card".
Co-pending U.S. Appl No. 12/417,211, filed Apr. 2, 2009, titled "System, Program Product, And Associated Methods To Autodraw For Micro-Credit Attached To A Prepaid Card".
Co-pending U.S. Appl. No. 12/417,182, filed Apr. 2, 2009, titled "System, Program Product, And Method To Authorize Draw For Retailer Optimization".
Co-pending U.S. Appl. No. 12/407,320, filed Mar. 19, 2009, titled "Computerized Extension of Credit To Existing Demand Deposit Accounts, Preparid Cards And Lines Of Credit Based on Expected Tax Refund Proceeds, Associated Systems And Computer Program Products".
Co-pending U.S. Appl. No. 12/417,162, filed Apr. 2, 2009, titled "System, Program Product, And Method For Debit Card And Checking Account Autodraw".
Co-pending U.S. Appl. No. 12/367,187, filed Feb. 6, 2009, titled "Government Targeted-Spending Stimulus Card System, Program Product and Computer-Implemented Methods".
Co-pending U.S. Appl. No. 12/465,277, filed May 13, 2009, titled "System, Program Product, and Computer-Implemented Method for Loading a Loan on a Pre-Paid Card".
Co-pending U.S. Appl No. 12/465,306, filed May 13, 2009, titled "System, Program Product, and Computer-Implemented Method for Loading a Loan on an Existing Pre-Paid Card".
Co-pending U.S. Appl. No. 12/465,803, filed May 13, 2009, titled "System, Program Product, and Method for Loading a Loan on a Pre-Paid Card".
Office Action dated Sep. 28, 2010 for co-pending U.S. Appl. No. 12/338,402, filed Dec. 18, 2008.
Office Action dated Sep. 3, 2010 for co-pending U.S. Appl. No. 12/417,162, filed Apr. 2, 2009.
Co-pending U.S. Appl. No. 12/554,659, filed Sep. 4, 2009, titled "System, Method, and Program Product for Foreign Currency Travel Account".
Co-pending U.S. Appl. No. 12/554,432, filed Sep. 4, 2009, titled "System, Program Product and Methods for Retail Activation and Reload Associated With Partial Authorization Transactions".
Cross, Sam Y., All About . . . the Foreign Exchange Market in the United States, 1998, Federal Reserve Bank of New York.
Final Office Action dated Jan. 26, 2011, in co-pending U.S. Appl. No. 12/338,365.
Final Office Action dated Jan. 26, 2011, in co-pending U.S. Appl. No. 12/338,645.
Final Office Action dated Jan. 19, 2011, in co-pending U.S. Appl. No. 12/417,162.
Office Action dated Feb. 1, 2011, in co-pending U.S. Appl. No. 12/389,749.
Co-pending U.S. Appl. No. 12/814,405 filed Jun. 11, 2010 titled Environmental-Friendly Fuel Credit Card System, Program Product, and Computer-Implemented Methods.
Co-pending U.S. Appl. No. 12/877,490 filed Sep. 8, 2010 titled System, Program Product, and Method for Debit Card and Checking Account Autodraw.
Co-pending U.S. Appl. No. 12/877,524 filed Sep. 8, 2010 titled System, Program Product, and Method for Debit Card and Checking Account Autodraw.
Co-pending U.S. Appl. No. 12/562,331 filed Sep. 18, 2009 titled Computerized Extension Of Credit To Existing Demand Deposit Accounts, Prepaid Cards And Lines Of Credit Based On Expected Tax Refund Proceeds, Associated Systems and Computer Program Products.
Kirin, Gary, et al., A Birthday Card That Pays Off, The Orange County Register, Jul. 19, 1996, 2 pages.
Cohen, Bruce, Alternative to Cash Gains Ground, The Financial Post, Apr. 22, 1994, 2 pages.
Bank of Boulder POS Debit Solution at the Table Now in Beta: First Bank to Certify IVI Spirit C2000 on MAPP (R), Business Wire, Aug. 3, 1994, 1 page.
Co-pending U.S. Appl. No. 12/700,681, filed Feb. 4, 2010.
Co-pending U.S. Appl. No. 12/889,281, filed Sep. 23, 2010.
Co-pending U.S. Appl. No. 12/892,847, filed Sep. 28, 2010.
Co-pending U.S. Appl. No. 12/731,852, filed Mar. 25, 2010.
Microtrax Ltd., PC Electronic Payment Systems Reference Manuel, 1995 (381 pages).
John P. Caskey and Gordon H. Selton, Jr., Is the Debit Card Revolution Finally Here?, Federal Reserve Bank of Kansas City, Economic Review, Fourth Quarter 1994, pp. 70-95, vol. 79 #4 (17 pages).
Laura Castaneda, Business Promote Services to Customers Day In and Day Out, The Dallas Morning News, Nov. 26, 1994, 3 pages.
Margaret Mannix, Checkout Tech, U.S. News & World Report, Feb. 27, 1995, 6 pages.
Credit Terminals to be Used at Canadian Liquor Outlets, Card News, Jan. 23, 1995, 1 page.
Debit Card Popularity on the Rise, Chain Store Age Executive, Jan. 1994, 1 page.
Debit Goes to Dinner, Credit Card Management, New York, Oct. 1994, 2 pages.
Alan Peppard, Down and Dirty in Deep Ellum, The Dallas Morning News, Dec. 3, 1994, 2 pages.
Everest Reference Manual, VeriFone Part No. 25399, Revision A, Manual Revision 1.0, Jul. 1995, 66 pages.
Express Cards and Trains, Chain Store Age Executive Edition, Jan. 1995, 1 page.
Suzanne Brown, Goodnight Amy, Meg, Beth and Jo, Rocky Mountain News, Dec. 8, 2994, 1 page.
Robert J. Klein, Here Comes the Debit Card, D&B Reports, Jul./Aug. 1990, 2 pages.
Hypercom S7C Advertisement, Chain Store Age, Sep. 1995, 4 pages.
Hypercom S7SC Advertisement, Chain Store Age, Feb. 1996, 2 pages.
IBM 4680-4690 Advanced Payment System for Chain Drug Sales Application User's Guide, Nov. 1996, 256 pages.
IBM 4680-4690 Advanced Payment System for Chain Drug Sales Application User's Guide, Jul. 1996, 248 pages.

(56) References Cited

OTHER PUBLICATIONS

IBM 4680-4690 Advanced Payment System for Supermarket Application User's Guide, Sep. 1996, 222 pages.
Fox, Linda A., Keep an Eye on Your Credit Card, The Toronto Sun, Aug. 9, 1996, 1 page.
Pyatt, Rudolph A., Jr., Mobil Stations to Permit Use of Bank Cards, The Washington Post.
NCR 4430-5000 MSR/PIN User's Guide, 1994, 265 pages.
Nieman Marcus: High-Tech for the Holidays, ADWEEK, Dec. 5, 1994, 1 page.
Neiman Marcus Offers Electronic Gift Certificate, Card Fax, Jan. 23, 1995, 1 page.
Neiman Marcus to Lauch NM Express Automated Gift Card, PR Newswire, Nov. 22, 1994, 1 page.
NM Express Card Advertisement, The New Yorker, Dec. 12, 1994, 3 pages.
Service Mark Registration No. 1,981,044 for "NM Express Card", registered Jun. 18, 1996, 1 page.
Omni 480/490 Programmer's Guide, VeriFone Part No. 12924—Revision A, Manual Revision 1.0, Oct. 1993, 228 pages.
One Company's Diversification Shakes Up Peripherals Market, Chain Store Age, Jun. 1996, 3 pages.
O'Keefe, Michael, Portable POS Debit Terminal Mean Greater Convenience, Bank Systems & Technology, Nov. 1994, 2 pages.
POS Terminal Can Handle Direct Debits, ABA Banking Journal, Sep. 1984, 2 pages.
Racal Corp. Advertisement, POS Terminal Eliminates Credit Card Vouchers, ABA Banking Journal, Nov. 1985, 2 pages.
Szabo, Joan C., The Changing World of Financial Services, Nation's Business, Oct. 1994, 7 pages.
VeriFone Everest Advertisement, Stores, May 1995, 2 pages.
VeriFone Folio (TM) Brings Credit and Debit Card Payment to the Restaurant Table, PR Newswire, May 16, 1994, 3 pages.
David B. Barnes, VeriFone Introduces Everest (TM) Customer Activated Payment System to Multi-Lane Retail Market, PR Newswire, Feb. 20, 1995, 2 pages.
VeriFone Introduces Pinpad (TM) 1000 to Point-of-Sale Debit Market, M2 Presswire, Apr. 21, 1995, 1 page.
Co-pending U.S. Appl. No. 13/036,076, filed Feb. 28, 2011, titled Machine, Program Product, and Computer Implemented Method to Construct a Person-To-Person Loan.
Office Action dated Feb. 18, 2011, in co-pending U.S. Appl. No. 12/338,402.
Office Action in co-pending U.S. Appl. No. 12/609,896 dated Apr. 5, 2011.
Office Action in co-pending U.S. Appl. No. 12/417,162 dated Apr. 13, 2011.
Orszag, Peter, "Unemployment Insurance as an Economic Stimulus", Center for Budget and Policy Priorities, Nov. 15, 2011.
Powell, Robert L., "Statewide Electronic Commerce Program Status Report", State of North Carolina Office of the State Controller, Mar. 7, 2007.
Parrott, James, "Jittery Wall Street, Calm City?", Gotham Gazette, Apr. 16, 2007.
Zandi, Mark, "Washington Throws the Economy a Rope", Moody's Economy.com, Jan. 22, 2008.
Blair, Christine E., et al., "Challenges to the Dual Banking System: The Funding of Bank Supervision", FDIC Bank Review, Mar. 31, 2006.
Office Action for co-pending U.S. Appl. No. 12/367,187 dated Jun. 27, 2011.
"Developing Asia and the World", Asian Development Bank 2002.
Notice of Allowance in co-pending U.S. Appl. No. 12/554,659 dated Aug. 2, 2011.
Office Action in co-pending U.S. Appl. No. 12/338,712 dated Jul. 28, 2011.
Office Action in co-pending U.S. Appl. No. 12/338,440 dated Aug. 1, 2011.
Financial Advice Investment Money Oct. 1, 2009 at 5:50pm, HSBC Offshore Internet Banking (as cited on Notice of Allowance in co-pending U.S. Appl. No. 12/554,659 by Examiner).
Financial Advice Investment Money Oct. 1, 2009 at 7:25am, HSBC Offshore Internet Banking (as cited on Notice of Allowance in co-pending U.S. Appl. No. 12/554,659 by Examiner).
Office Action dated Mar. 17, 2011, in co-pending U.S. Appl. No. 12/417,199.
Office Action dated Mar. 17, 2011, in co-pending U.S. Appl. No. 12/465,803.
Office Action dated Mar. 22, 2011, in co-pending U.S. Appl. No. 12/338,584.
Office Action dated Mar. 29, 2011, in co-pending U.S. Appl. No. 12/417,211.
Office Action dated Mar. 29, 2011, in co-pending U.S. Appl. No. 12/407,320.
VeriFone TCL Terminal Control Language Programmer's Manual, VeriFone Part No. 00368-01, Revision G, Manual Revision 8.0, Aug. 1992, 362 pages.
VeriFone Tranz 330 Reference Manual, Verifone Part No. 00483-Revision D, Manual Revision 3.01, Apr. 1990, 144 pages.
MicroTrax Ltd. Omni 490M (and 490ML) Operation Manual for Integrated and Non-Integrated Configurations, 1994, 60 pages.
MicroTrax Electronic Payment Systems: The MicroTrax Pinstripe Lane Equipment Users Guide, MicroTrax Ltd., Newport Beach, CA 1991, 54 pages.
IBM 4680-4690 Supermarket Application—Electronic Funds Transfer Feature Enhancement: User's Guide, IBM Corp., Research Triangle Park, NC, Sep. 1995, 318 pages.
IBM 4680 General Sales Application Electronic Funds Transfer User's Guide, IBM Corp., Research Triangle Park, NC, Dec. 1990, 260 pages.
IBM 4680 General Sales Application Electronic Funds Transfer User's Guide, IBM Corp., Research Triangle Park, NC, Mar. 1991, 263 pages.
IBM 4680 General Sales Application: Guide to Operations, Research Triangle Park, NC, Jun. 1991, 429 pages.
Final Office Action for co-pending U.S. Appl. No. 12/889,281 dated Apr. 8, 2013.
Final Office Action for co-pending U.S. Appl. No. 12/892,847 dated Mar. 29, 2013.
Final Office Action for co-pending U.S. Appl. No. 13/036,076 dated Apr. 8, 2013.
Final Office Action for co-pending U.S. Appl. No. 13/214,126 dated Aug. 1, 2013.
Final Office Action for co-pending U.S. Appl. No. 13/349,290 dated Mar. 14, 2013.
Garriss, J., (2004), Forging an ideal HSA, Workspan, 47(5), 18-25, Retrieved Sep. 3, 2013.
Letter of Credit Explained: What is Letter of Credit?, Dec. 26, 2005, 2 pages.
Office Action for co-pending U.S. Appl. No. 12/367,187 dated Aug. 1, 2013.
Office Action for co-pending U.S. Appl. No. 12/397,113 dated Oct. 15, 2013.
Office Action for co-pending U.S. Appl. No. 12/626,349 dated Nov. 27, 2013.
Wolfe, Daniel, An E-Variation on Payday Loan Theme, American Banker, Jul. 28, 2005.
Downes, How to avoid exchange charges Wasting Money a foreign currency bank account could be the answer, the Daily Telegraph, London (UK), Mar. 10, 2007.
Office Action for co-pending U.S. Appl. No. 13/232,405 dated Feb. 2, 2012.
Office Action for co-pending U.S. Appl. No. 12/877,524 dated Feb. 14, 2002.
Notice of Allowance for co-pending U.S. Appl. No. 12/417,182 dated Feb. 14, 2012.
Final Office Action for co-pending U.S. Appl. No. 12/338,497 dated Mar. 1, 2012.
Final Office Action for co-pending U.S. Appl. No. 12/465,277 dated Feb. 28, 2012.

(56) References Cited

OTHER PUBLICATIONS

Office Action from co-pending U.S. Appl. No. 12/626,349, dated Nov. 22, 2011.
Notice of Allowance for co-pending U.S. Appl. No. 12/417,162 dated Oct. 1, 2012.
Office Action for co-pending U.S. Appl. No. 13/214,126 dated Oct. 4, 2012.
Notice of Allowance for co-pending U.S. Appl. No. 12/607,780 dated Oct. 9, 2012.
Final Office Action for co-pending U.S. Appl. No. 13/232,700 dated Oct. 12, 2012.
Office Action for co-pending U.S. Appl. No. 13/284,524 dated Oct. 15, 2012.
Notice of Allowance for co-pending U.S. Appl. No. 13/601,724 dated Oct. 18, 2012.
Office Action for co-pending U.S. Appl. No. 13/536,765 dated Nov. 30, 2012.
Notice of Allowance for co-pending U.S. Appl No. 13/282,186 dated Dec. 17, 2012.
Office Action for co-pending U.S. Appl. No. 12/607,780 dated Mar. 19, 2012.
Notice of Allowance for co-pending U.S. Appl. No. 12/465,803 dated Mar. 20, 2012.
Notice of Allowance for co-pending U.S. Appl. No. 12/562,331 dated Mar. 20, 2012.
Ex-parte Quayle Action for co-pending U.S. Appl. No. 12/700,681 dated Mar. 23, 2012.
Final Office Action for co-pending U.S. Appl. No. 12/389,749 dated Mar. 29, 2012.
Final Office Action for co-pending U.S. Appl. No. 12/731,852 dated Apr. 5, 2012.
Final Office Action for co-pending U.S. Appl. No. 12/465,306 dated Apr. 11, 2012.
Notice of Allowance for co-pending U.S. Appl. No. 13/349,423 dated Apr. 13, 2012.
Office Action for co-pending U.S. Appl. No. 12/877,490 dated Apr. 18, 2012.
Office Action for co-pending U.S. Appl. No. 12/892,847 dated Apr. 30, 2012.
Final Office Action for co-pending U.S. Appl. No. 12/338,440 dated Jan. 19, 2012.
Office Action for co-pending U.S. Appl. No. 12/465,306 dated Nov. 10, 2011.
Office Action for co-pending U.S. Appl. No. 12/338,497 dated Aug. 18, 2011.
Final Office Action for co-pending U.S. Appl. No. 12/338,540 dated Mar. 15, 2012.
Wolf, File History of US 2005/0278347.
Check Cashers Move Into Cards, Accounts (Cover Story), ATM & Debit News [serial online], Apr. 20, 2006, 6(24), pp. 1-3, available from Business Source Complete, Ipswich, MA.
Mangu-Ward, K.; (Oct. 2009), Payday of Reckoning, Reason, 41(5), pp. 40-47, retrieved Jun. 15, 2012, from Research Library (Document ID:1861658171).
Wolf, Alan Steven, What to do when the Chain Breaks, Servicing Management, Feb. 1997, 3 pages.
99Bill Launches Installment Credit Services, (Aug. 21, 2008), PR Newswire, 2 pages, retrieved Jul. 9, 2012, from Business Dateline (Document ID: 1536854041).
Intralinks, Inc. Begins European Rollout of Its Proven Electronic Solution for Loan Syndication, London (Business Wire), Oct. 8, 1997, 3 pages.
Final Office Action for co-pending U.S. Appl. No. 13/232,405 dated May 22, 2012.
Office Action for co-pending U.S. Appl. No. 13/405,051 dated Jun. 6, 2012.
Final Office Action for co-pending U.S. Appl. No. 12/877,524 dated Jun. 8, 2012.
Notice of Allowance for co-pending U.S. Appl. No. 12/700,681 dated Jun. 11, 2012.
Notice of Allowance for co-pending U.S. Appl. No. 13/365,982 dated Jun. 26, 2012.
Office Action for co-pending U.S. Appl. No. 12/554,432 dated Jun. 29, 2012.
Office Action for co-pending U.S. Appl. No. 13/349,290 dated Jul. 3, 2012.
Notice of Allowance for co-pending U.S. Appl. No. 12/338,540 dated Jul. 9, 2012.
Office Action for co-pending U.S. Appl. No. 13/282,186 dated Jul. 13, 2012.
Notice of Allowance for co-pending U.S. Appl. No. 13/330,397 dated Jul. 18, 2012.
Final Office Action for co-pending U.S. Appl. No. 12/367,187 dated Jul. 19, 2012.
Final Office Action for co-pending U.S. Appl. No. 13/232,700 dated Jul. 19, 2012.
Final Office Action for co-pending U.S. Appl. No. 12/626,349 dated Jul. 20, 2012.
Office Action for co-pending U.S. Appl. No. 13/036,076 dated Jul. 24, 2012.
Notice of Allowance for co-pending U.S. Appl. No. 13/481,950 dated Jul. 30, 2012.
Notice of Allowance for co-pending U.S. Appl. No. 13/405,079 dated Aug. 6, 2012.
Notice of Allowance for co-pending U.S. Appl. No. 13/474,519 dated Aug. 27, 2012.
Office Action for co-pending U.S. Appl. No. 12/889,281 dated Aug. 30, 2012.
Notice of Allowance for co-pending U.S. Appl. No. 13/232,405 dated Sep. 4, 2012.
Notice of Allowance for co-pending U.S. Appl. No. 12/338,497 dated Sep. 17, 2012.
Notice of Allowance for co-pending U.S. Appl. No. 12/877,490 dated Sep. 20, 2012.
Final Office Action in co-pending U.S. Appl. No. 12/338,584 dated Sep. 15, 2011.
Notice of Allowance in co-pending U.S. Appl. No. 12/338,645 dated Oct. 3, 2011.
Office Action in co-pending U.S. Appl. No. 12/417,182 dated Sep. 28, 2011.
Office Action in co-pending U.S. Appl. No. 12/397,113 dated Sep. 30, 2011.
Zubko, N., "An Automotic Connection Electronic Transaction Tools Help Manufacturers Connect With Suppliers to Streamline Sourcing Efforts", Industry Week, Jul. 2008, pp. 26-27, vol. 257, No. 7.
Notice of Allowance from co-pending U.S. Appl. No. 12/609,896 dated Oct. 27, 2011.
Office Action from co-pending U.S. Appl. No. 12/465,277 dated Oct. 20, 2011.
Office Action from co-pending U.S. Appl. No. 12/562,331 dated Oct. 20, 2011.
Notice of Allowance from co-pending U.S. Appl. No. 12/407,320 dated Oct. 18, 2011.
Congressional Budget Office, "Emerging Electronic Methods for Making Payments" (Jun. 1996), CBO.
Coady et al., "Targeted anti-poverty intervention: A selected annotated bibliography" (Apr. 2002), World Bank.
Notice of Allowance from co-pending U.S. Appl. No. 12/609,896 dated Jan. 3, 2012.
Notice of Allowance from co-pending U.S. Appl. No. 13/233,268 dated Dec. 13, 2011.
Office Action from co-pending U.S. Appl. No. 12/367,187 dated Jan. 6, 2012.
Office Action from co-pending U.S. Appl. No. 12/731,852 dated Dec. 22, 2011.
Business Dateline, Q Comm Expands Calling Card Products with Best Telecom Point-of-Sale Activated Cards; All Q Comm VeriFone Merchants Can Now Deliver Durable Calling Cards (Dec. 6, 2010), Business Wire (Dec. 8, 2011)
Notice of Allowance from co-pending U.S. Appl. No. 12/465,803 dated Dec. 20, 2011.
MasterCard Electronic prepaid (Oct. 2003). The Nilson Report, (798), (Dec. 9, 2011), The Banking Source (Document ID 474833171).

* cited by examiner

FIGURE 2

Get cardholder balances, and reversals work the same.
Day 2, Loan Processor sends loan file. Day 3, Loan Sale.

Available Information

Both  Loan Processor
Card#  Loan #
Trans $  Date of Loan
Date/Time  (post date)

80

**Reconciliation
(report for matchoff)**

| Both | Loan Processor | API |
|---|---|---|
| X | - | X |
| - | X | X |
| - | - | X |
| X | X | X |

| Reconciliation (report for matchoff) | |
|---|---|
| Table <br> Pymt_His | Processor <br> Posted Pymts |
| X | - |
| - | X |
| X | X |

230

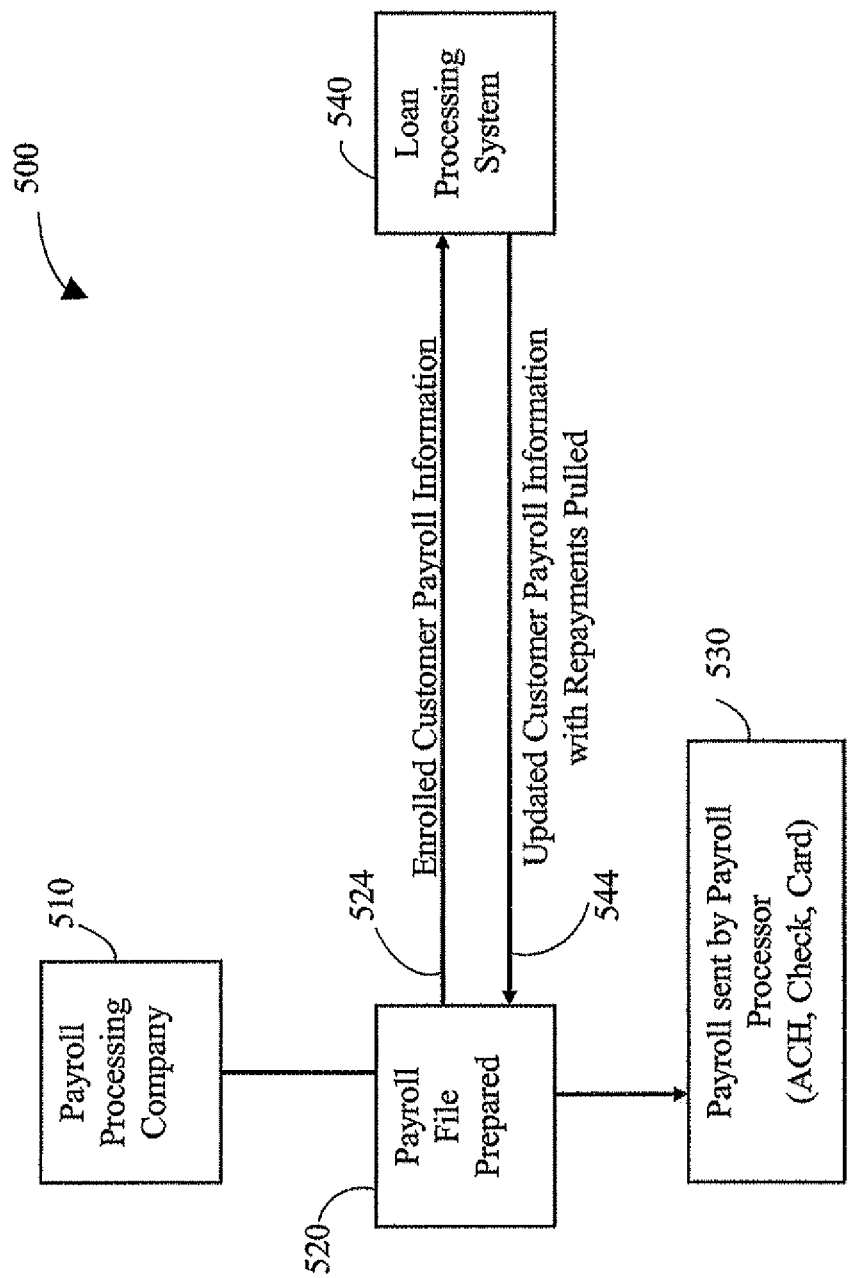

| Browser Tool Bar |
|---|

Create New Account

Complete the fields below to set up Customer Line of Credit ("LOC") account. Click on the CONTINUE button for next screen. The CANCEL button returns you to the Log-In page without saving any changes.

Required fields are marked *

LOC Account Details

Create User ID ☐

Create Password ☐

Confirm Password ☐

Verification Information

Prepaid Card Number ☐

Last 4 Digits of Your SSN ☐

Year of Birth ☐

E-mail Account Details (*optional*)

E-mail Address ☐

Confirm E-Mail Address ☐

Computer Screen Interface Menu

COMPUTER-IMPLEMENTED METHODS, PROGRAM PRODUCT, AND SYSTEM FOR MICRO-LOAN PRODUCT MANAGEMENT

RELATED APPLICATIONS

This application claims priority to and the benefit of U.S. Provisional Patent Application Ser. No. 61/016,213, by Sorbe et al., titled "Transfer Account Systems, Computer Program Products, and Associated Methods" filed Dec. 21, 2007; U.S. Provisional Patent Application Ser. No. 61/052,454, by Sorbe et al., titled "Transfer Account Systems, Computer Program Products, and Methods to Prioritize Payments from Preselected Bank Account" filed May 12, 2008; U.S. Provisional Patent Application Ser. No. 61/029,975, by Sorbe et al., titled "Methods To Advance Loan Proceeds On Prepaid Cards, Associated Systems and Computer Program Products" filed on Feb. 20, 2008; U.S. Provisional Patent Application Ser. No. 61/042,612, by Ahlers et al., titled "System, Program Product, and Associated Methods To Autodraw for Micro-Credit Attached to a Prepaid Card" filed on Apr. 4, 2008; U.S. Provisional Patent Application Ser. No. 61/042,624, by Crowe et al., titled "System, Program Product, and Method To Authorize Draw for Retailer Optimization" filed on Apr. 4, 2008; U.S. Provisional Patent Application Ser. No. 61/032,750, by Ahlers et al., titled "Methods, Program Product, and System for Micro-Loan Management" filed on Feb. 29, 2008; U.S. Provisional Patent Application Ser. No. 61/060,559, by Galit et al., titled "Methods, Program Product, and System to Enhance Banking Terms Over Time" filed on Jun. 11, 2008; U.S. Provisional Patent Application Ser. No. 61/082,863, by Ahlers et al., titled "System, Program Product, and Method For Debit Card and Checking Account Autodraw" filed on Jul 23, 2008; U.S. Provisional Patent Application Ser. No. 61/053,056, by Galit et al., titled "System, Program Product, and Method For Loading a Loan On a Pre-Paid Card" filed on May 14, 2008, all of which are each incorporated herein by reference in their entireties. This application also relates to U.S. patent application Ser. No. 12/338,365, by Sorbe et al., titled "Transfer Account Systems, Computer Program Products, and Associated Computer-Implemented Methods" filed on the same day as this application, Dec. 18, 2008; U.S. patent application Ser. No. 12/338,402, by Sorbe et al., titled "Transfer Account Systems, Computer Program Products, and Associated Computer-Implemented Methods" filed on the same day as this application, Dec. 18, 2008; U.S. patent application Ser. No. 12/338,440, by Sorbe et al., titled "Transfer Account Systems, Computer Program Products, and Associated Computer-Implemented Methods" filed on the same day as this application, Dec. 18, 2008; U.S. patent application Ser. No. 12/338,584, by Sorbe et al., titled "Transfer Account Systems, Computer Program Products, and Computer-Implemented Methods to Prioritize Payments from Preselected Bank Account" filed on the same day as this application, Dec. 18, 2008; U.S. patent application Ser. No. 12/338,465, by Sorbe et al., titled "Transfer Account Systems, Computer Program Products, and Computer-Implemented Methods to Prioritize Payments from Preselected Bank Account" filed on the same day as this application, Dec.18, 2008; and U.S. patent application Ser. No. 12/338,712, by Galit et al., titled "Computer-Implemented Methods, Program Product, and System to Enhance Banking Terms Over Time" filed on the same day as this application, Dec. 18, 2008, all of which are each incorporated herein by reference in their entireties.

BACKGROUND

1. Technical Field

The present invention relates generally to the financial service and banking industries, and, more particularly, to systems, program products, and associated methods for providing a micro-loan product to prepaid cards, bank cards, bank accounts, and bank product management.

2. Related Background

It is known that tens of millions of consumers in the US have either limited or no access to traditional credit, either as a result of poor or limited credit history. It is further known that millions of prepaid cards are issued each year in the United States. It is also known that many of the customers of prepaid cards rely primarily on cash and a prepaid card account for their personal finances; these customers, for example, often do not have a traditional checking, savings, or other bank deposit account, and they usually do not write checks. It has been acknowledged by many that those without bank accounts and who often rely on prepaid cards may be underserved. These consumers are typically not easily able to access credit through traditional banking channels, though they may have an ongoing relationship with a prepaid card issuer, for example.

One area of under-service may be in lending and lending practices. For example, it is recognized that short-term lending is a $20 billion plus per year industry, and some industry experts believe an appropriate manner of offering micro-lending may be through a federal bank, especially to those underserved such as those not having a checking account or other bank deposit account. Yet there can be many obstacles to those being underserved to using a federal bank or any bank for that matter, based on, for example, lack of effective bank products, risks associated with bank products, and costs to those being underserved does not, or is not perceived to, outweigh the benefits for use of existing bank products.

SUMMARY OF INVENTION

In view of the foregoing, Applicant has recognized a need for enhanced lending options, bank products, and prepaid and other bank card products. The present invention provides embodiments of systems, program products, and associated methods for micro-loans, including through and by use of prepaid cards, as well as other banking cards, and bank product management and enhanced lending options for both banks and bank customers, as well as other financial institutions.

For example, Applicant has recognized a growing demand and need within the prepaid industry to provide some type of overdraft protection or credit option to consumers who generally fall into the underserved category and historically have had only expensive financial alternatives in their times of greatest need. According to embodiments of systems, program products, and methods of providing a line of credit, the line of credit operates as a micro-lending open line of credit product provided by a bank such as through a computer network, a global communication network such as the Internet or Web 2.0, or through computer program product stored on a tangible computer readable memory or storage device. This embodiment of a line of credit type product, for example, provides a meaningful enhancement to consumers by offering a service that is commonly used and important to consumers today, e.g., advance access to a future electronic deposit. Qualified borrowers may be approved for a line of credit from which borrower approved draws can be initiated in small dollar increments. Draw funds then can be available immediately for use.

Some of the beneficial features of this line of credit product, for example, are providing various types of assistance to consumers with the management of their finances by providing a short-term borrowing alternative that is more cost effective than other expensive financial service products such as overdraft protection and payday loans, more convenient to consumers, and more under control of the individual consumer. This embodiment of a line of credit product, however, can still be by and for the bank and monitored, controlled and managed by the bank. This embodiment of a line of credit product is far less costly than other alternatives. This can be a significant benefit from the perspective of the consumer, regulators, and public opinion through consumer activists.

Another example of embodiments of systems, program products, and methods according to the present invention includes a payment computer network system of banking partners to provide attractive distribution opportunities to banks and to bank customers. For example, an embodiment of a direct deposit product can be key to prepaid card (or other types of banking cards, as well as core demand deposit accounts (individually "DDA" or collectively "DDAs")) persistency and is often a requirement for consumer qualification for a line of credit. Draws from an account in the embodiments, for example, can be initiated via telephone or interactive voice response unit ("IVRU") thereby allowing the consumers to meet their financing needs without the need to walk into a brick and mortar location. These draws, for example, can be available in preselected increments, e.g., $20 increments, so that consumers are not forced to borrow amounts that exceed their borrowing needs. This type of draw as a line of credit, for example, can significantly reduce or alleviate the cycle of debt dependency which is common with other financial alternatives by providing the consumer more control over loan amounts and needs and by inhibiting the lending institution from charging unwanted fees.

For example, according to an embodiment of a method of advancing funds to a banking customer, the method includes establishing a line of credit with a bank through an access interface with the bank. The access interface can be defined to include an interface access device providing access to a bank line of credit product to interface with a potential customer to establish the line of credit, e.g., a computer display device, a kiosk, such as located at a retail store, a point of sale terminal, an IVRU, a call center, a cell phone, a personal digital assistant ("PDA"), on-line sensors, or other access interfaces as understood by those skilled in the art. The method also includes determining whether access to finds through the line of credit should occur for a customer transaction and providing one or more preselected increments of funds for the customer transaction. The preselected increments, e.g., $20, for example, can be less than a total available line of credit, e.g., $300, for a customer having an established line of credit with the bank. The method further includes decrementing the total available line of credit, e.g., $300, by the one or more preselected increments, e.g., $20, provided for the customer transaction and a predetermined fee amount, e.g., $1 or $2, for each of the one or more preselected increments of funds. A line of credit amount, for example, can be established based on direct deposit and preselected underwriting formula, as understood by those skilled in the art, that use the amount of direct deposits, among other factors, to determine the size of the credit line available.

In an embodiment of a program product stored in one or more tangible computer readable media and readable by a computer, for example, the program product can operate to perform the following instructions when read by the computer: establishing a line of credit for a customer with a bank through an access interface with the bank, determining whether access to funds through the line of credit should occur, providing one or more preselected increments of funds, the preselected increments being less than a total available line of credit with the bank, and decrementing the total available line of credit by the one or more preselected increments and a predetermined fee amount for each of the one or more preselected increments of funds. The program product can further operate to perform the instruction of establishing a direct deposit prior to the establishing of a line of credit, the direct deposit including a direct deposit history so that determination of whether to establish a line of credit is responsive to the direct deposit history.

Another embodiment of a method of advancing funds to a customer of a bank includes establishing a line of credit for a customer with a bank through an access interface with the bank. The access interface, for example, can include a computer display device providing visible access to a bank line of credit product to interface with a potential customer to establish the line of credit. Other visible and non-visible access interfaces can also be used as understood by those skilled in the art. The method also includes determining whether access to funds through the line of credit should occur for a customer transaction and providing only one or more preselected increments of funds for the customer transaction. A cumulative amount of the one or more preselected increments preferably is less than a total available line of credit for a customer having an established line of credit with the bank. An embodiment of a method also can include, for example, decrementing the total available line of credit by the cumulative amount of the one or more preselected increments provided for the customer transaction and a predetermined fee amount for each of the one or more preselected increments of funds.

An embodiment of a system to advance funds to a customer, for example, includes a plurality of customer access interface devices and a remote computer server positioned to provide communication with each of the plurality of customer access interface devices, being associated with a financial institution, and having memory. The system also includes program product stored in the memory of the computer server so that the program product operates to perform the instructions of: establishing a line of credit for a customer with the financial institution through at least one of the plurality of access interface devices with the remote computer server, the at least one access interface device being defined to provide access to a line of credit product from the financial institution for interface with a potential customer to establish the line of credit; determining whether access to funds through the line of credit should occur for a customer transaction, initiating provision of only one or more preselected increments of funds for the customer transaction, a cumulative amount of the one or more preselected increments being less than a total available line of credit for a customer having an established line of credit with the financial institution; and decrementing the total available line of credit by the cumulative amount of the one or more preselected increments provided for the customer transaction a predetermined fee amount for each of the one or more preselected increments of funds.

Embodiments of the present invention also allow the combining of product enhancements with other complimentary enhancements and can continue to provide significantly improved services and products to underserved people by banking or other financial institutions with the conveniences of traditional banking products.

BRIEF DESCRIPTION OF DRAWINGS

So that the manner in which the features and benefits of the invention, as well as others which will become apparent, may be understood in more detail, a more particular description of the invention briefly summarized above may be had by reference to the embodiments thereof which are illustrated in the appended drawings, which form a part of this specification. It is also to be noted, however, that the drawings illustrate only various embodiments of the invention and are therefore not to be considered limiting of the invention's scope as it may include other effective embodiments as well.

FIG. 2 is a set of tables illustrating processor loan set up flow of FIG. 1 according to embodiments of the present invention;

FIG. 4 is a table illustrating processor repayment funding flow of FIG. 3 according to embodiments of the present invention;

FIG. 11 is a schematic diagram of a payroll processor system according to an embodiment of the present invention;

FIG. 12 is a schematic front elevational view of an embodiment of an access interface of a program product and system in the form of a graphical user interface of a display of a computer according to an embodiment of the present invention.

DETAILED DESCRIPTION OF INVENTION

Figure 1:
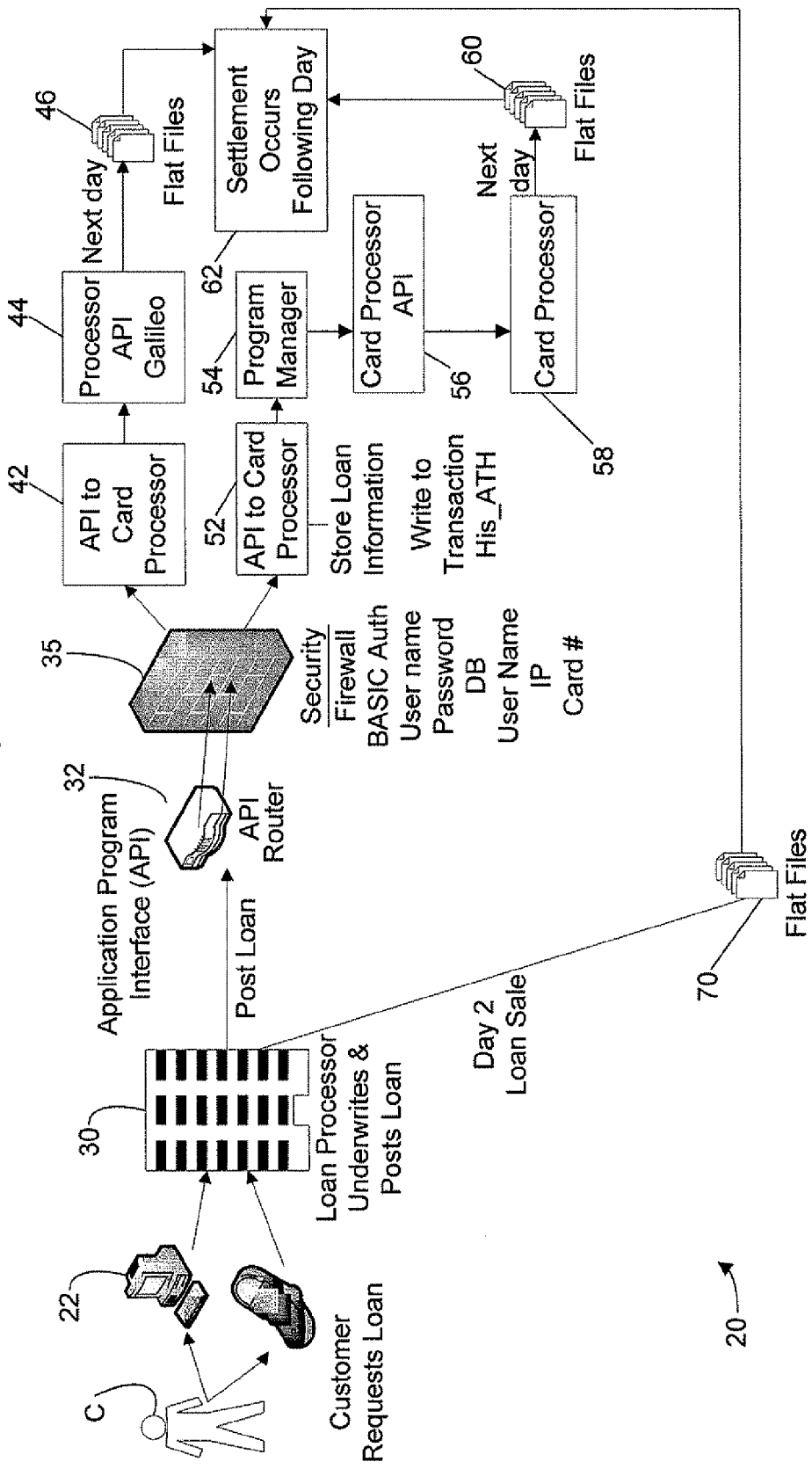
FIG. 1 is a schematic diagram of loan set up flow according to embodiments of the present invention.
Figure 3:
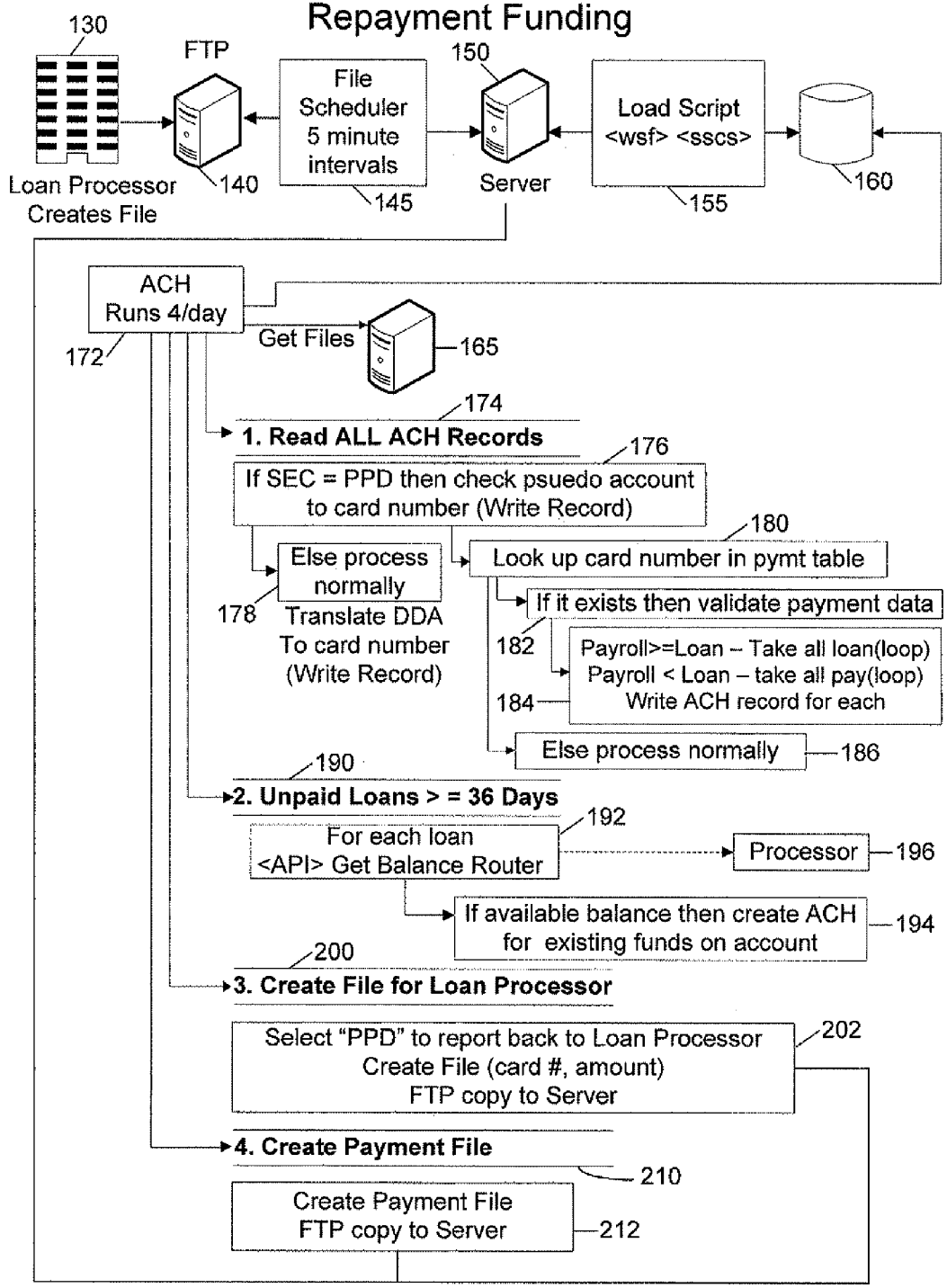
FIG. 3 is a schematic diagram of repayment funding flow according to embodiments of the present invention.
Figure 5:
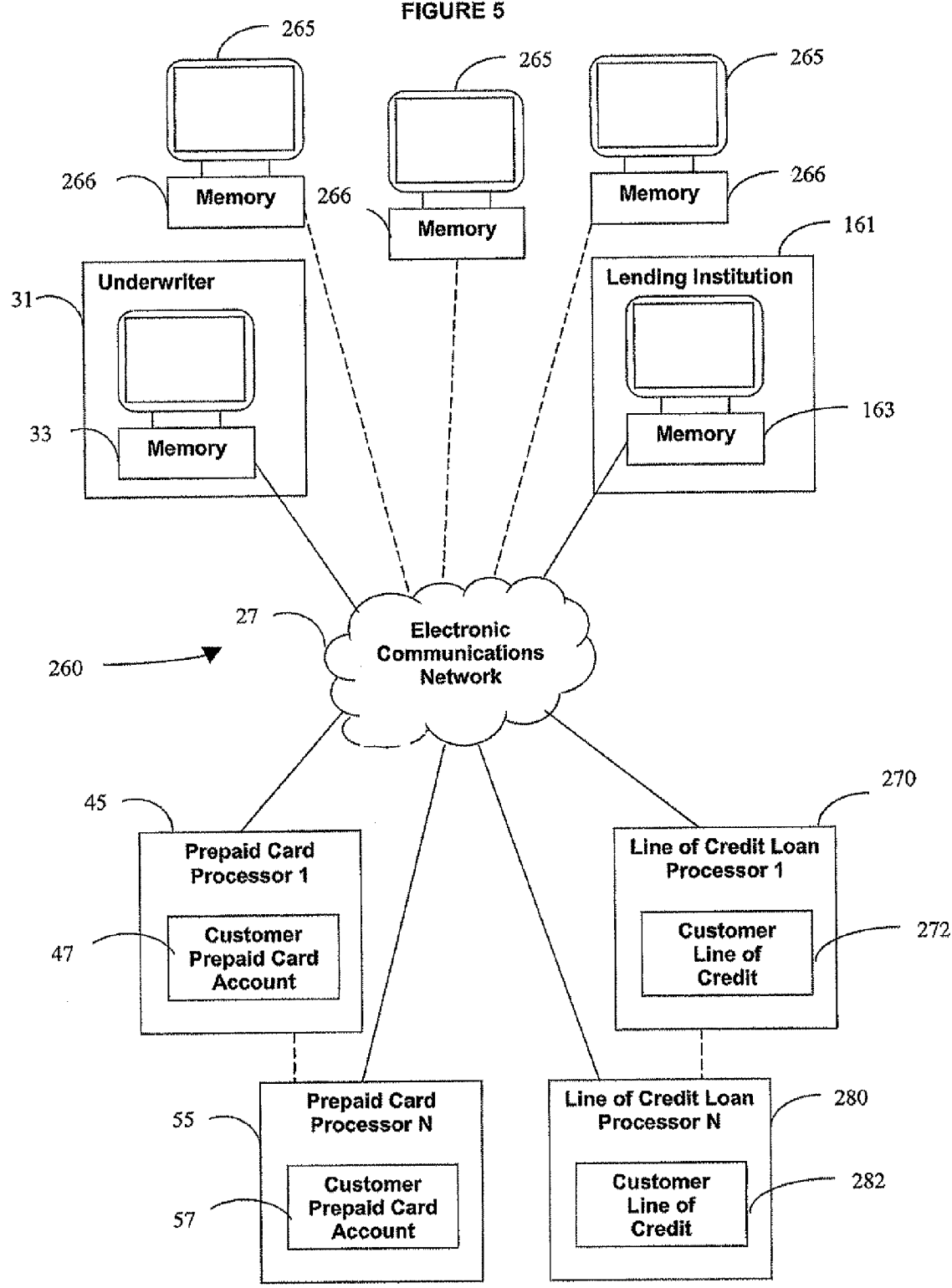
FIG. 5 is schematic diagram of a plurality of computers of a system accessing a remote computer server having program product stored in memory thereof according to an embodiment of the present invention.
Figure 6:
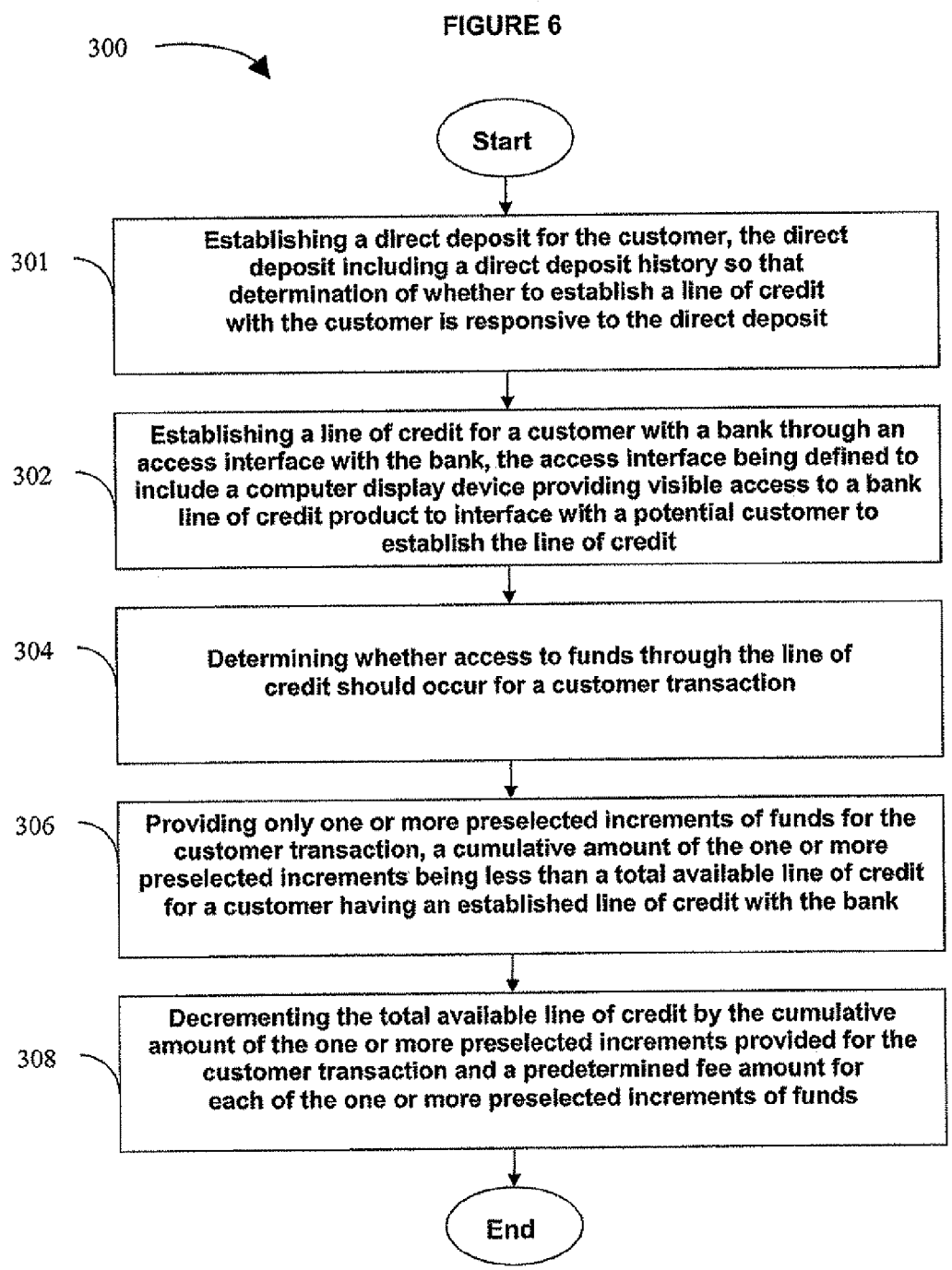
FIG. 6 is a flow diagram of a method of advancing funds according to an embodiment of the present invention.
Figure 7:
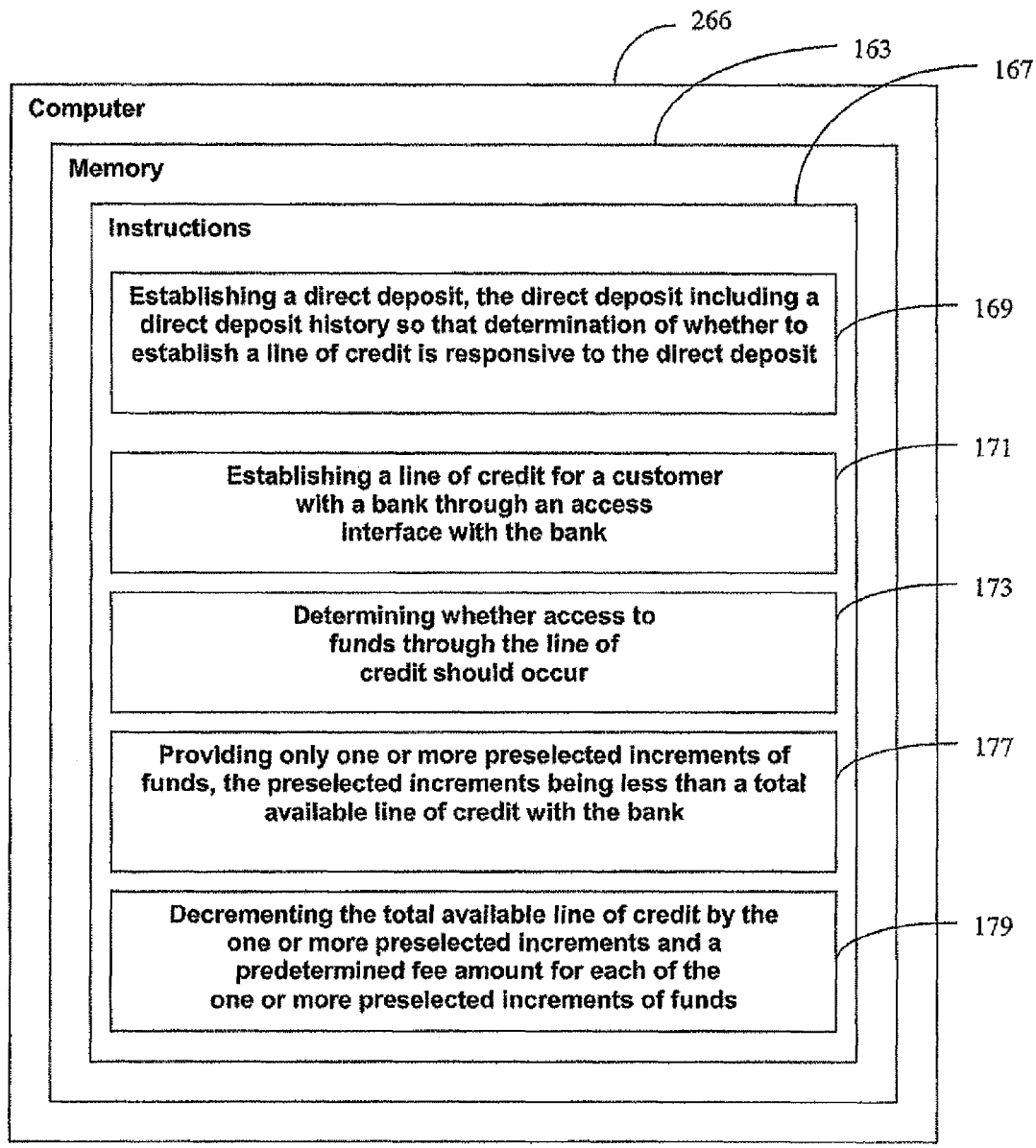
FIG. 7 is a schematic diagram of a computer server having program product stored in memory thereof according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

As illustrated in FIGS. 1-12, embodiments of systems 20, 120, 260, program product 167, 300 and methods 300 of the present invention can be provided through a communication network 27 such as a global communication network like the Internet, World Wide Web, or Web 2.0, through a banking type of network, or through a retail, customer or intranet type of network as understood by those skilled in the art. Program product 167, 300, for example, can be stored on a computer server 31, 160, 161 at an office, underwriter or bank location 30, 130 having memory 33, 163 and be accessible by a plurality of computers 265, and each can have their own respective memory 266, as well as operating system and browsing software or program product if desired and as understood by those skilled in the art at bank customer locations, e.g., consumer homes, office, retail locations (see, e.g., FIGS. 1, 3, and 5). When launched as an accessible website, for example, the website can provide various software based program product segments, as will be understood by those skilled in the art, from which bank products are accessible or downloadable (see, e.g. FIGS. 5-7). The website preferably includes secure site pages or portions, as understood by those skilled in the art, as financial and personal data on or for customers may be provided by a customer. As described and illustrated herein, the website in an exemplary embodiment includes bank account, bank card or prepaid card management capabilities as understood by those skilled in the art so enhance qualification of customers and tracking of customer usage data or history. By including this feature, embodiments of other program products, methods, and systems can be enhanced and provided.

For example, through a communication network form on the website, by telephone or IVRU 22, customer information can be gathered from one or more customers C based on preselected customer qualification parameters established by a bank, or other financial institution or organization. Customer qualification parameters can be facilitated through use of line of credit and card processors as understood by those skilled in the art (see, e.g., FIGS. 1-2). For example, banks, especially federally chartered banks, can establish and receive Office of Thrift Supervision (OTS) approval for, these preselected qualification parameters, and preferably no third party has the right to modify these parameters. Although third parties may be permitted to collect application data from consumers C, this data should then be forwarded to the bank, or financial institution or organization, to be processed for approval. Embodiments of methods, program products and systems, for example, can be used in association with prepaid cards or prepaid debit cards as understood by those skilled in the art.

Figures 9A, 9B:
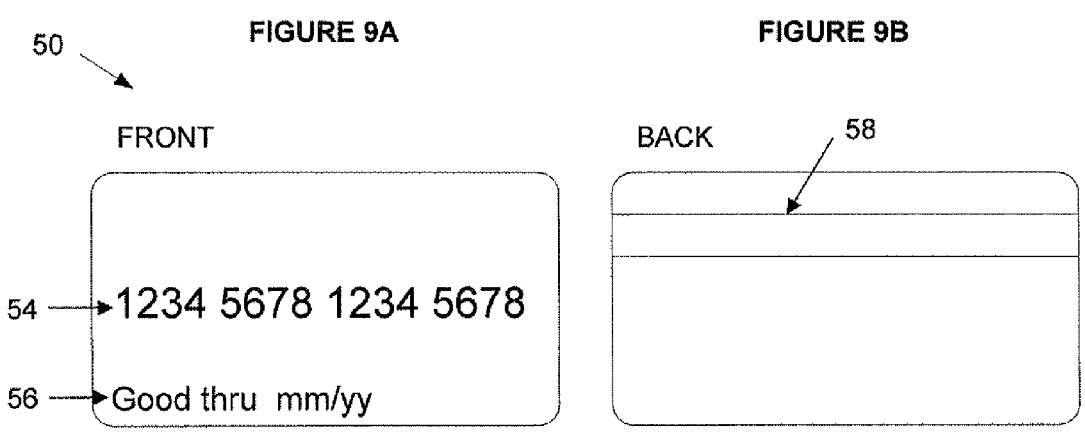
FIGS. 9A and 9B are respective front and back plan views of a prepaid card according to an embodiment of the present invention.
Figure 10:
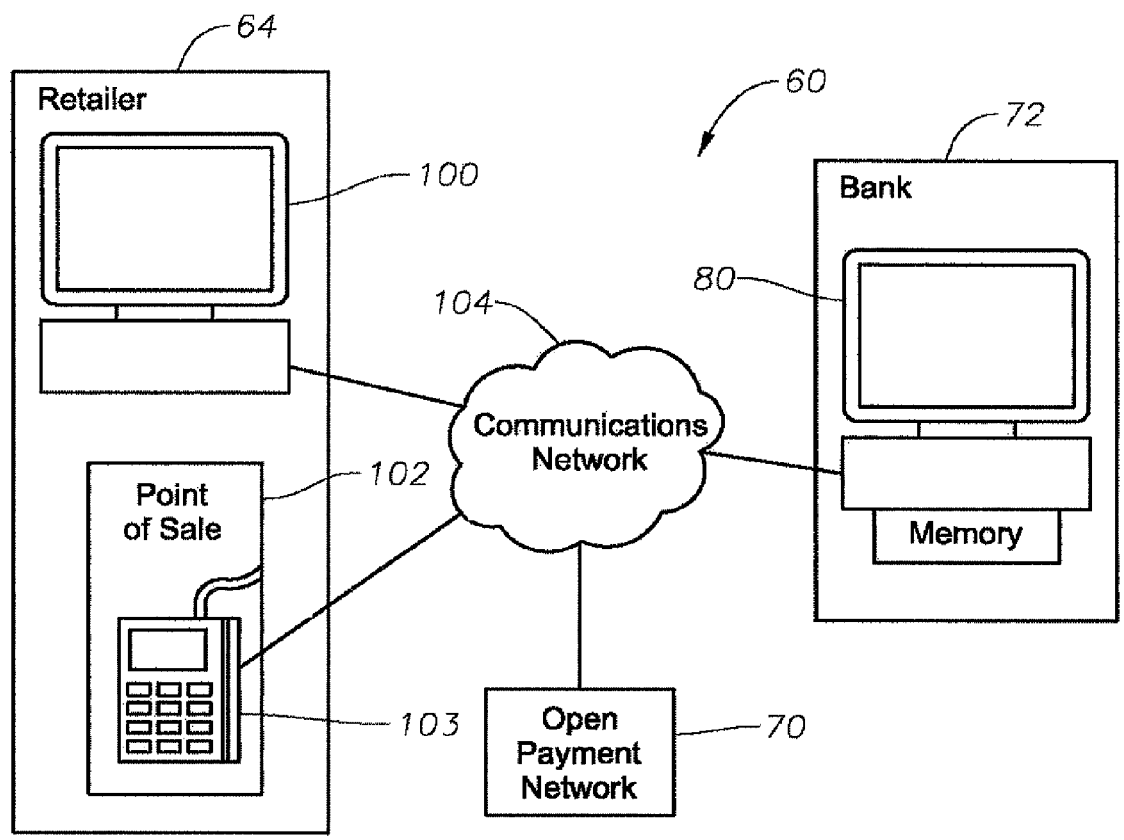
FIG. 10 is a schematic diagram of a customer using a prepaid card in a point of sale customer transaction in a system according to an embodiment of the present invention.

In an embodiment of a system 460 according to the present invention, and as shown in FIGS. 9A-9B and 10, prepaid cards 100 often have a magnetic stripe 106, as understood by those skilled in the art, and are coded so that the code when received by a point of sale terminal 474, e.g., see FIG. 10, or other consumer purchase interface such as at a retailer 464, also often having a retailer computer or server 470, processes the code so that a prepaid or authorized value is associated with the code to thereby, for example, allow purchases with the prepaid card usage through a communications network 271 and an open payment network 478, as understood by those skilled in the art, to authorize payment from a bank 480 or other financial institution, e.g., having its own one or more computers or computer servers 482, and decrement the total amount of the net purchase from the amount or value associated with the card 100.

In an embodiment of this customer qualification program product 167, 300, for example, the following initial qualification parameters are examples of what has or can be defined by the bank: (1) customer should be a prepaid card customer; (2) customer should provide employment and wage verification (direct deposit history); (3) customer should authorize bank initiated withdrawals from their prepaid card; and (4) customer should have a history of at least one electronic deposit. In addition, the following on-going criteria, for example, should be met: (1) customer's card account should be in good standing, not overdrawn, cancelled or in default of the customer agreement; and (2) customer should continue to initiate electronic deposits to the card. The bank or lending institution, for example, may elect to make the account ineligible for a line of credit if an electronic deposit ceases. The bank can have a dedicated program manager qualify, approve or authorize a customer or can use program product stored in memory to make sure the criteria or parameters are satisfied or meet certain thresholds as selected by the bank or lending institution.

For example, a customer C can go on-line through a computer or IVRU 22 in a system 20 to register at a website using a program product according to embodiments of the present invention and launched from a server, e.g., at a loan processor, underwriting organization, bank, lending institution, other financial institution, payroll processing company, or other entity which can provide the line of credit product, among others, as will be understood by those skilled in the art. The form or qualification parameters can be consistent with one or more underwriting organizations or institutions or set/defined by the bank or lending institution.

As understood by those skilled in the at, a loan, micro-loan, repayment, line of credit, or other type of payment processor such as provided by First Data Corp., Total Systems, Inc., Fidelity National Information, Inc., or as custom developed by a bank, a financial institution, or other organization, operates to provide a customer interface on a line of credit or micro-loan request (see, e.g., access interface 550 of FIG. 12 in the form of a computer display having a graphical user interface) and determines an decides whether a potential or existing customer qualifies for a line of credit product. This line of credit or loan processor 270, for example, can be outsourced by a bank if desired, and numerous different loan processors or entities that handle this function can be used as well (see, e.g., FIG. 5 with a plurality of computers or computer servers 270 to 280 handling the payment processor and interface access roles for customer lines of credit 272 to 282, for example). If the customer qualifies, the credentials can be passed to a bank or other financial institution or other organization, and then a flag, code, notation, or other identifier can be associated with a customer's profile so that when the customer desires to access the line of credit, e.g., through a customer purchase transaction using the prepaid card, the process acknowledges the identifier to then allow incremental micro-loans on the line of credit to be granted as described herein. Notably, often a loan or other type of payment processor is card processor specific, and in this instance, a dedicated card processor (see, e.g., prepaid card processors 45 to 55 in FIG. 5, and these processors likewise can be associate with computers and have customer prepaid card accounts 47 to 57 associated with or processed thereby as understood by those skilled in the art) can be used, but also as shown in FIGS. 1-2 and described further in U.S. provisional Patent Application Ser. No. 61/029,975 titled "Methods To Advance Loan Proceeds on Prepaid Cards, Associated Systems and Computer Program Products" filed on Feb. 20, 2008 and incorporated herein by reference methods can be used as well to handle card interface to a variety of card processors (e.g., Metavante Corporation ("Metavante") of Milwaukee, Wis.) as understood by those skilled in the art.

The customer transaction using a prepaid card, for example, can then cause the request for the micro-loan through the line of credit processor or other payment processor. The credit processor then posts notification of the micro-loan request through an API Post to post the micro-loan in real time through an API Router 32 as understood by those skilled in the art. The API Router 32 passes the request through a security firewall 35 which passes the request through the API to a card processor 42, such as Metavante, and Process to API 44. This information can be compared to flat files 46, 60, 70, e.g., data files that have no structural relationship as understood by those skilled in the art, or flat files database and the bank or institution reconciles the loan transaction with the customer's line of credit or other account 62. Some card processors, for example, provide additional processor interfaces or allow development of additional processor interfaces, as understood by those skilled in the art, (see, e.g., APT to Program Manager 52 (e.g., Program Manager operations, for example, can be provided by various financial solution/program management companies, such as AccountNow of San Ramon, Calif., as understood by those skilled in the art), program manager 54, and Program Manager API 56) such as Metavante card processor 58 should such processor be used by the credit processor or other payment processor for a customer transaction. As illustrated in FIG. 2, for example, getting cardholder balances and reversals operate in a related manner. When availability of a line of credit loan is posted, e.g., see available information table 80, information on the card number, transaction dollar amount, and date/time are made available by the loan processor. Reconciliation reports and actions, e.g., see reconciliation table 90 of FIG. 2, can also take place for both the loan processor and the API so that card processing is performed well and enhanced by the bank (or card processors).

According to embodiments of the present invention a company or bank can affiliate with a loan processor so that integration of the line of credit product can be accomplished with significantly reduced, little, or no development resources needed by the company or bank. Such integration, as understood by those skilled in the art, involves establishing appropriate website links, IVRU handoffs, transaction testing, and training for business development and marketing personnel. Once a customer is noted as being eligible for a line of credit product, for example, an amount or value barrowed by the customer can be associated with or determined by their recent direct deposit history. The customer can then access a website of the bank or entity providing the line of credit to determine their credit limit or by using an IVRU or telephone as understood by those skilled in the art.

For embodiments of methods of the present invention, an embodiment of repayment funding 120 can occur so that a loan processor 130, or other payment processor, creates a file, transfers it by file transfer protocol (FTP) 140 and a file scheduler 145 to a computer server 150, e.g., such as at the bank. The computer server 145 then operates to receive a load script 155 from a database 160, e.g., can be a flat file database if desired. The load script from the database, for example, can come from ACH runs 172, e.g., 4 per day, on a separate computer or computer server 165 if desired. All ACH records are read 174, unpaid loans greater than or equal to 36 days are checked 190, a file is created for the loan processor 200, and a payment file is created 210 (see, e.g., FIGS. 3 and 11). Examples of steps for reading the ACE files, checking unpaid loan files, creating file for loan processor and creating payment file are shown. For example, if SEC=PPD then check pseudo account to card number (Write Record) 176, look up card number in payment table 180, if it exists then validate payment data 182, if payroll is greater than or equal to loan then take all loan (loop), if payroll is less than loan, then take all pay (loop), and write ACH record for each 184 can be performed or else process normally 178, 186 can be used in direct deposit or payroll situations. For unpaid loans, for each loan, the API can get balance router 192 and send to card processor 196 unless if available balance then create ACH for existing funds on account 194. To create file, select PPD to report back to loan processor, create file (card number, amount), and send by FTP to server can occur 202, for example. For create payment file, after create payment file an FTP can be sent to server 212 as well, as understood by those skilled in the art. Reconciliation for repayment can also be performed as illustrated in the table 230 of FIG. 4, According to embodiments of methods, program product and system of the present invention, the line of credit product 300, including amounts, can be supplemented over time, especially as positive repayment history continues (see, e.g., FIGS. 3-4), additional information regarding the creditworthiness of the customer comes to light (e.g., increase in direct deposit amounts through wage increases or ownership of assets information is provided), or enhanced criteria formula are develop to allow a customer to provide additional information helpful to additional creditworthiness. A supplement, for example, can include an increase in the line of credit amount, increase in the term or time of repayment, a change in the interest rate, or an increase in the number of repayments over which a customer repays the amount borrowed (e.g., from one (1) to perhaps the next six (6) direct deposits), among others.

Another feature of an embodiment of a system, program product and method, can be enrollment for potential customers. For example, by default, all cardholders within a payroll program provided by an approved program manager and card processor can be or become eligible for a line of credit product. A cardholder, however, should first enroll before a line will be made available for use. For non-payroll opportunities, eligibility, for example, can be based on a recurring electronic deposit. Presentation of a line of credit product option on a cardholder computer display or screens can be controlled by a card processor/program manager and based on program participation as understood by those skilled in the art. Enrollment for the line of credit product can then occur via the web connection or IVRU, for example.

In an exemplary embodiment, there are no general exclusions for eligibility. Rather, the consumer should simply meet the eligibility requirements. Once a consumer is enrolled for a line of credit product, an enrollment flag can be set for that borrower/customer. Successful enrollment, for example, can include receipt and acceptance of the full terms and conditions of the line of credit, or other bank product/website, terms and conditions as understood by those skilled in the art. A privacy policy can also be provided as part of initial enrollment and annually thereafter. Upon successful enrollment, the qualifying line amount will then be available to the borrower.

In an exemplary embodiment, line or line of credit amounts can be solely determined by a bank, or other financial institution or organization, and can be facilitated through a line of credit processor as understood by those skilled in the art. Available amounts will be based upon recurring electronic deposit amounts. For example, initial total line amounts can be limited to $300 for cardholders with less than one month of electronic deposits. The $300 limit then can apply for the first full month of service. Initial total line amounts for borrowers with one or more month of electronic deposits can equal a preselected percentage, e.g., 80 percent, of the average net electronic deposit amount (amount of deposit/@ of deposits) rounded down to the nearest preselected increment, e.g., $20. Ongoing total line amounts for all borrowers, for example, can also equal 80 percent of the average electronic deposit amount rounded down to the nearest $20. The maximum total line amount at any time, for example, can be twice the fall monthly limit, e.g., $600. Available line limits can be decreased only by draw amounts, not by fee amounts to allow full access to the funds.

In addition, in an exemplary embodiment, suspension of the line of credit can occur. For example, if the borrower initiates draws for more than twelve (12) consecutive advance periods (defined as 35 days) the line can be reduced by $100 each period thereafter until it reaches $0. After one period of $0 availability, the initial $300 line amount will be restored and subsequent line amounts calculated as detailed above. If, on the other hand, the card balance is negative for a preselected time period, e.g., seven (7) consecutive days, the line can be suspended until such time that the card balance is positive.

Further, for example, special events such as an interruption in employment (electronic deposit) may make the borrower ineligible for the line of credit product or service, and the line of credit can be temporarily suspended if the outstanding line amount and any related fees are not paid within a bank designated period of time, e.g., 35 days. The bank can then establish that the line will not be reinstated until all outstanding amounts have been paid. After the line is reinstated the initial line preselected limit, e.g., $300, will once again apply for one period.

In another exemplary embodiment, the line of credit amount can change. For example, if the borrower's verifiable income (electronic deposit amount) changes, their total line limit may change (increase or decrease). The bank can reserve the right, at any time, and upon notice when required by applicable law, to modify the borrower's credit limit based on the customer's use of the line of credit product, handling of funds on the bank issued prepaid debit card, or any other reason at the bank's sole discretion. This, for example, can advantageously provide the bank with control over the effective management of the credit line product. The total line amount available the first month after a lapse in service, for example, can be $300. A lapse in service may be due to non-payment, negative card balance, or a break in electronic deposit transaction history. Again, providing the bank with enhanced management control. As will be understood by those skilled in the art, each card processor may have to support payments differently based on their ACH and transaction posting systems and processes.

Also, embodiments of systems, program products, and methods of the present invention can include, for example, for substantially all programs if desired, features such as any repayment of draws on the line of credit can be automatically collected from the next electronic deposit regardless of payment source. As payments are received, fees also can be paid first then the payment applied to the oldest outstanding draw amount. When payments are received, total available line limit is restored by the payment amount. If funds from the electronic deposit are not sufficient to cover the outstanding balance, a partial repayment can be made in the fall amount of the electronic deposit resulting in an unpaid balance on the line, Repayment of the remaining unpaid balance can be taken from subsequent electronic deposits until the line has been paid in full. Other cash equivalent repayment options also can be accepted and processed by a line of credit processor as understood by those skilled in the art.

It will also be understood by those skilled in the art that embodiments of the line of credit product or program product, for example, can be associated with a payroll processing company that processes direct deposits (see, e.g., FIG. 11). Embodiments of the program product and methods can be added to product or service offerings by the payroll processing company 510 so that it can be offered to their customers independent of bank or product (DDA or payroll card), by taking money or funds out at the source 510, e.g., as the payroll file is prepare 520 and before the direct deposit is even originated, or loaded onto a prepaid card 100, for example. These embodiments can also allow the processing company 510 to have more direct information on employment history. A payroll processing company 510 can also use a loan processing system 540, loan processor, or other payment processor either within their facilities or as an outsourcing entity to allow the provision of enrolling and providing customer payroll information 524 and for tracking and reconciling repayment or updated customer payroll information with repayments pulled 544. The payroll can be sent, loaded or processed by a payroll processor 530 for ACH transmittal, check generation, or card loading/providing, for example (see, e.g., FIG. 11). These embodiments of associated methods, for example, can include providing a card 100, e.g., with magnetic stripe coded information or other coded card, as understood by those skilled in the art, as well as a card number 102 and expiration date 104 if desired on a front of the card 100 (see, e.g., FIGS. 9A-9B) to an employee who gets direct deposit to a DDA whereby the consumer borrow funds from the service/product and has those funds direct deposited onto the card instantly and repaid by pulling finds from the direct deposit file prior to sending to the other bank account to repay the amount withdrawn. An example of and more details on how repayment can be accomplished is illustrated in U.S. Provisional Patent Application Ser. No. 61/016,213 titled "Transfer Account Systems, Computer Program Products, and Associated Methods" filed on Dec. 21, 2007 which is incorporated herein by reference in its entirety.

Additionally, along these lines, any repayment of a line supersedes repayment of a negative balance on a card due to force posts or settlement transactions that cause the card to go negative. Any monies remaining after a payment is received can be credited to the prepaid card account. If payment takes the card balance to $0, any transactions attempted with the card can be declined. Those transactions can be subject to any related decline fees. Repayment of a draw, for example, should not be taken from the principal balance on a card. That is, if a card balance is positive prior to a draw, only when the next electronic deposit is initiated to the card will repayment be triggered. If a draw is not paid within the preselected time period, preferably days, e.g., 35 day timeframe, any amount owed can be taken from the principal balance on a card.

In an exemplary embodiment, a line of credit may be cancelled at any time by the borrower as long as all outstanding draws and fees have been paid in fall. Cancellation, for example, can occur via the IVRU, the web, or a live customer service agent. In addition, all advances on the line of credit should be authorized by the borrower. That is, there will be no automatic advances from the line to the account. All advances can be credited to the spending vehicle (card, account, etc.), and advances preferably are posted real-time and funds are available immediately as understood by those skilled in the art. Each advance period preferably should have a maximum of the preselected time period, e.g., 35 days. Advantageously, advances can be in preselected dollar, amount, or other value increments, e.g., of $20, up to the total line amount available to the customer. The customer may make as many advances as they desire within a period provided the aggregate amount of those advances does not exceed the total line limit. Each advance is associated with a new advance period (period begins on the date of the advance). If the account balance is negative, the advance, for example, can be applied as a "deposit" against the negative balance and the remaining funds will be available for use. If the electronic deposit is large enough, all outstanding advances will be paid by the deposit. If the electronic deposit is not large enough to cover all outstanding advances, the oldest advance will be paid first. An advance will be considered repaid in fill once the total advance amount and associated fees have been collected. An advance can be cancelled through the IVRU, the website, or via a live customer service agent as described, and in another embodiment such an advance can be cancelled only if funds from the draw have not been used. If cancellation occurs, for example, within 24 hours of the initial advance request, the advance amount and fees can be credited to the card account. If cancellation occurs after 24 hours, only the advance amount will be credited back to the card account. In an exemplary embodiment, only one advance per day can be cancelled In embodiments of a line of credit bank product according to embodiments of systems, methods, and program product of the present invention, fees for the line of credit bank product can be stated as a dollar amount per draw increment implied through an annual percentage rate (APR) of a preselected amount as understood by those skilled in the art. The APR is a measure of the cost of credit expressed as a yearly rate. Product fees can be exclusive of total line amount so that a customer has full and clear access to the total line amount, e.g., (1) Cardholder Fee-$2.50 per $20 advance (Purchaser Income paid by cardholder), and (2) Purchaser Fee-150 basis points (Bank Income paid by Purchaser). Any repayment of fees can be automatically collected from the next electronic deposit regardless of source. Other cash equivalent repayment options can be accepted and processed by line of credit processor as understood by those skilled in the art.

In embodiments as described herein, for example, once a customer becomes eligible for a line of credit product, the customer's available credit limit can be obtained by logging onto the website on the bank of a card and select the "Line of Credit" product, or by calling a Line of Credit Customer Service number on the bank of the card. Like other lines of credit, as transfer funds from a line of credit occur, an available limit will decrease. When the funds are repaid, the customer's available credit limit is restored. A finance charge, for example, can be a one-time transaction charge and not dependent on the length of time the accessed funds are outstanding. The finance charge, for example, can be $2.50 for every $20 that is accessed.

When subsequent deposits are made to a prepaid card, an automatic repayment of the outstanding balance and finance charge can be made. Any deposits (such as a customer's payroll or benefit-related income, tax refund, or other special one-time non-repetitive deposits) can be used for repayment. For example, if a customer receives a paycheck every two weeks, the accessed funds and finance charge can be repaid on the same day as the customer's deposit of a next paycheck as electronically deposited and onto the prepaid debit card, even if the customer accessed the funds only one or two days prior to the next deposits. This type of credit in these examples can be expensive and will require a customer to plan ahead. For example, if a customer receives a paycheck every two weeks and needs a $200 credit advance for approximately two months, the $200 credit advance will be repaid with the customer's next paycheck, and the customer may need to take another credit advance. In this scenario, the absence of other sources of income, a customer would need to initiate a credit advance four times during the two-month period and would incur a total of $100 in finance charges (four $200 credit advances at a cost of $25 per credit advance equals $100). If an incoming deposit is not sufficient to repay the full outstanding credit advance amount and a finance charge, a partial repayment can be made resulting in an unpaid balance. A bank, for example, can take repayment of the remaining unpaid balance from any deposit until the credit advance and finance charge is repaid in full. For example, assume a customer has a total outstanding balance of $180 ($160 borrowed and a $20 finance charge), and the customer receives an electronically deposited paycheck of $150. The bank will take $20 for the outstanding finance charge and $130 for repayment thereby leaving a $30 remaining balance to be paid. The remaining $30 unpaid balance will be repaid from the next electronic deposit. If any credit advance or finance charge is not repaid in full within 35 days from the date of the transaction, however, the bank can automatically debit your prepaid debit card for the necessary amount. If no electronic deposits (or electronic deposits in an insufficient amount) are made onto a card account for a period of 35 days, the bank can automatically debit any balance on the prepaid debit card for the full amount of any outstanding balance and finance charges. If there are insufficient funds on a prepaid debit card at that time, all remaining funds can be withdrawn so the customer will have a $0 balance and a pending payment of the remaining balance. As a result, any additional transactions on the prepaid debit card will be declined, which declines could be subject to fees, as set froth in the terms and conditions applicable to a card. If a customer cannot repay a remaining line of credit balance a finance charge, the customer risks the termination of future access to the line of credit.

According to other embodiments, a customer may access a line of credit (in $20 increments) as often as they customer desires—up to the customer's available credit limit. This service is designed to provide access to cash on a short-term basis when a customer may need it most. If a customer uses the service for more than 12 consecutive periods, the credit limit can be gradually reduced by $100 in future periods until a credit limit is $0 or a customer does not use the service for one period. For example, assume a customer's calculated line of credit is $500, and the customer has used the line of credit service in each of the last 12 consecutive periods. In the $13^{th}$ period, the customer's line of credit limit will be $400 ($500 less $100). If the customer continues to use the service thereafter, the line of credit limit will continue to decrease by $100 each consecutive period until it equals $0 for one period. The customer can avoid this reduction in standard credit limit if the customer does not access the lie of credit for one complete period at any time. When a customer accesses the service, the funds are automatically transferred onto a prepaid debit card. If the prepaid debit card is negative, the credit will be applied as a "deposit" against a negative balance. If a prepaid debit card balance is negative for up to seven consecutive days, the customer will not be able to access the line of credit product until the customer's card has a positive balance. If a customer is in a situation where the funds on the prepaid debit card may be insufficient to cover transactions for which the customer typically uses the card, the customer may choose to access the line of credit product to avoid declines on those transactions. In order for a credit advance to cover a transaction that otherwise would be declined for insufficient funds, however, the credit advance request must be completed before the customer incurs the transaction that otherwise would be declined. The funds will be automatically deposited onto the prepaid debit card. The line of credit product can be an expensive form of credit, and although the finance charge may be lower than an overdraft or insufficient funds fee, the customer may want to consider other forms or short-term credit that may be available.

A bank, or other financial institution or organization, advantageously can define standards and best practices as they relate to customer service on the bank's line of credit product. Although cardholder customer service will remain a function of the card processor or program manager, customer service for the line of credit, for example, can be a function of the bank. As with everything related to the bank's line of credit product, it can be significant to maintain distinction between the card and the product itself.

Further, embodiments of methods, program product and system, as understood by those skilled in the art, allow expanded options as related to the line of credit also to be offered to a customer either at the outset of initiating a line of credit based on achievement of selected underwriting criteria or as an upgraded option to an existing line of credit customer based on positive repayment history. These options, for example, can include larger credit lines, longer repayment terms, repayment over multiple deposits, lower fees, and other terms that would be considered beneficial to consumers with either better credit history or demonstrated positive credit performance. In such fashion, consumers have more options available to lower costs and better enable them to match their borrowing needs (for example $200 needed for 3 months) with borrowing options (3 month repayment term). According to embodiments of a system, program product and methods, as will be understood by those skilled in the art, the customer can be provided additional or improved borrowing options based on either positive repayment history or positive underwriting determination. In such fashion, these embodiments can enable a customer to receive longer repayment terms, an option to repay over multiple pay periods, additional line of credit amount, lower fees, and other terms that provide benefits to consumers. The embodiments of a system, program product, and methods can either provide such options, for example, at the initiation of the relationship or as new and additional options to customers that have demonstrated positive repayment history.

Embodiments of methods, program product, and systems of the present invention particularly provide advantages to prepaid card users, or other underserved banking customers, and more mass market consumers, those particularly using DDAs. For example, by integrating a lender's methods, program products, and system with a bank's methods, program products, and systems an enhanced ability to assess deposit history, direct deposit proceeds to the account, e.g., minus repayment of all or portions of micro-loan and capture repayment in general is provided. By controlling incremental loan amounts banks can also reduce or limit risks of micro-loan advances as important updated information can continuously be provided, e.g., direct deposit amounts, frequency, and repayment history.

In an exemplary embodiment, calls to a line of credit IVRU or live agent may be redirected from the card processor/program manager or may come in directly. Upon verification, transaction options of the line of credit bank product can then be presented. Also, the card processor can be responsible for providing all card related transaction history. This includes activity on the line that is tied to the card. Activity on the line, for example, may not be detailed but rather may be presented as summary information. That is, information on line activity and fees will not be broken out and details such as specific loan number repaid will not be presented. Only advance and repayment with associated dollar amounts may be presented, for example. The card processor, for example, can be required to use the bank's established transaction descriptions for activity on the line. This transaction history then can be available via the IVRU, web, or live customer service agent.

The line of credit processor will be responsible for providing all line related transaction history. This transaction history will be available via the IVRU, web, or live customer service agent and presented to the borrower. Transaction detail on the line of credit product should be detailed and break out principle, fees, specific loan numbers as well as detailed transactions on repayments. Standard descriptions for the activity on the line will be established and must be used by all processors.

In an exemplary embodiment, for problem resolution related to the bank's line of credit product, a customer service group should be established as understood by those skilled in the art to assume the responsibility of the customer service group working in conjunction with the line of credit processor and card processor. As part of cardholder servicing, the customer service group should have a way to manually reverse draws, fees, or adjust line amount on the customer service system. That is, they should have access to the front end as well as the ability to facilitate manual transactions. In addition, a bank, or other financial institution or organization, as understood by those skilled in the art, can work with several partners to develop customer service standards, scripts, and service level agreements to further enhance effective management of embodiments of the bank product. Further, any marketing, sales, and fulfillment materials related to a bank's line of credit product can be created by the bank's payment systems. Approval of all materials can be at the sole discretion of bank's payment systems, and product and legal and modifications to the standard documents can be restricted or strictly prohibited. A bank also, for example, may allow co-branding of standard materials. There may also be an instance where an affiliate or vendor of the bank wants to employ materials other than the standard documents. Approval and use of non-standard collateral can be at the sole discretion of the bank or its legal personnel. Any collateral or system that includes information on a line of credit product, for example, can be available in both English and Spanish and can be available in other languages as well if desired. This includes all cardholder servicing portals, Terms and conditions in embodiments generally are standard and should be used by all programs. For example, there should be no deviation in content of these terms and conditions. The terms and conditions for the line of credit product, however, can be separate and distinct from a cardholder agreement, as understood by those skilled in the art, and any other terms and conditions provided to a cardholder.

A Frequently Asked Questions document (FAQ), as understood by those skilled in the art, can be created, posted on the website, and should accompany the terms and conditions that are delivered to the borrower. As with the terms and conditions, there should be no deviation in the content of this document. The frequently asked questions will be available on the website and mailed with the full terms and conditions sent to borrowers electing to enroll via the IVRU.

Statement processing, as understood by those skilled in the art, can be the responsibility of the card processor for card activity (see also FIGS. 1-4). Such card processors are well known in the banking industry. Fully compliant Regulation Z statements, as understood by those skilled in the art, should be provided to the consumer by the line of credit processor. Statements can be made available online and notification sent each month for statement availability. Statement summary information can also be presented by telephone or by IVRU. Tracking of statement retrieval, for example, can be performed by the line of credit processor. If a consumer is not retrieving statements via the IVRU or online, paper statements, for example, may be mailed.

A bank, as understood by those skilled in the art, can adopt best practices, e.g., industry standards or industry examples from top banks or other financial institutions, regarding processes for identifying and collecting delinquent line of credit amounts and determining charge-off procedures. The knowledge, practice, and experience of some of the more risk adverse payday lenders in the market, for example, can be considered and used effectively. If the delinquent loans are bundled or sold separately, for example, the purchase of such loans should be responsible for all collections and should be a licensed debt collector or outsource to a licensed debt collector. As such, the purchaser should be required to follow all appropriate state and federal rules and regulations.

In an exemplary embodiment, a bank, or other financial institution or organization, can reserve the right to change the terms of the line of credit agreement which may include discontinuing the line of credit service at any time with notice to the cardholder. Full and clear disclosure should be required for the line of credit program as understood by those skilled in the art. All terms, collateral materials, and marketing efforts should be approved by a bank payment management system. All statements, privacy notices, and regulatory disclosures required by applicable law should be reviewed prior to use and periodically thereafter by bank payment management system personnel. The bank payment management system, for example, can test APR calculations, monitor collection practices, and review all materials for ongoing compliance.

As illustrated in FIGS. 5-12, according to an embodiment of a method of advancing funds to a banking customer, the method includes establishing a line of credit with a bank through an on-line access interface with the bank 302. The on-line access interface can be defined to include a computer display device providing access to a bank line of credit product for interface with a potential customer to establish the line of credit. The method also includes determining whether access to funds through the line of credit should occur for a customer transaction 304 and providing only one or more preselected increments of funds for the customer transaction 306. The preselected increments, e.g., $20, for example, can be less than a total available line of credit, e.g., $300, for a customer having an established line of credit with the bank. The method further includes decrementing the total available line of credit, e.g., $300, by the one or more preselected increments, e.g., $20, provided for the customer transaction and a predetermined fee amount, e.g., $1 or $2, for each of the one or more preselected increments of funds 308. This embodiment of a method can also include establishing a direct deposit account, direct deposit relationship or other direct deposit with the customer prior to establishing the line of credit if desired 301. The direct deposit preferably includes setting up or providing a direct deposit history so that determination of whether to establish a line of credit with the customer can be responsive to the direct deposit.

Figure 8:
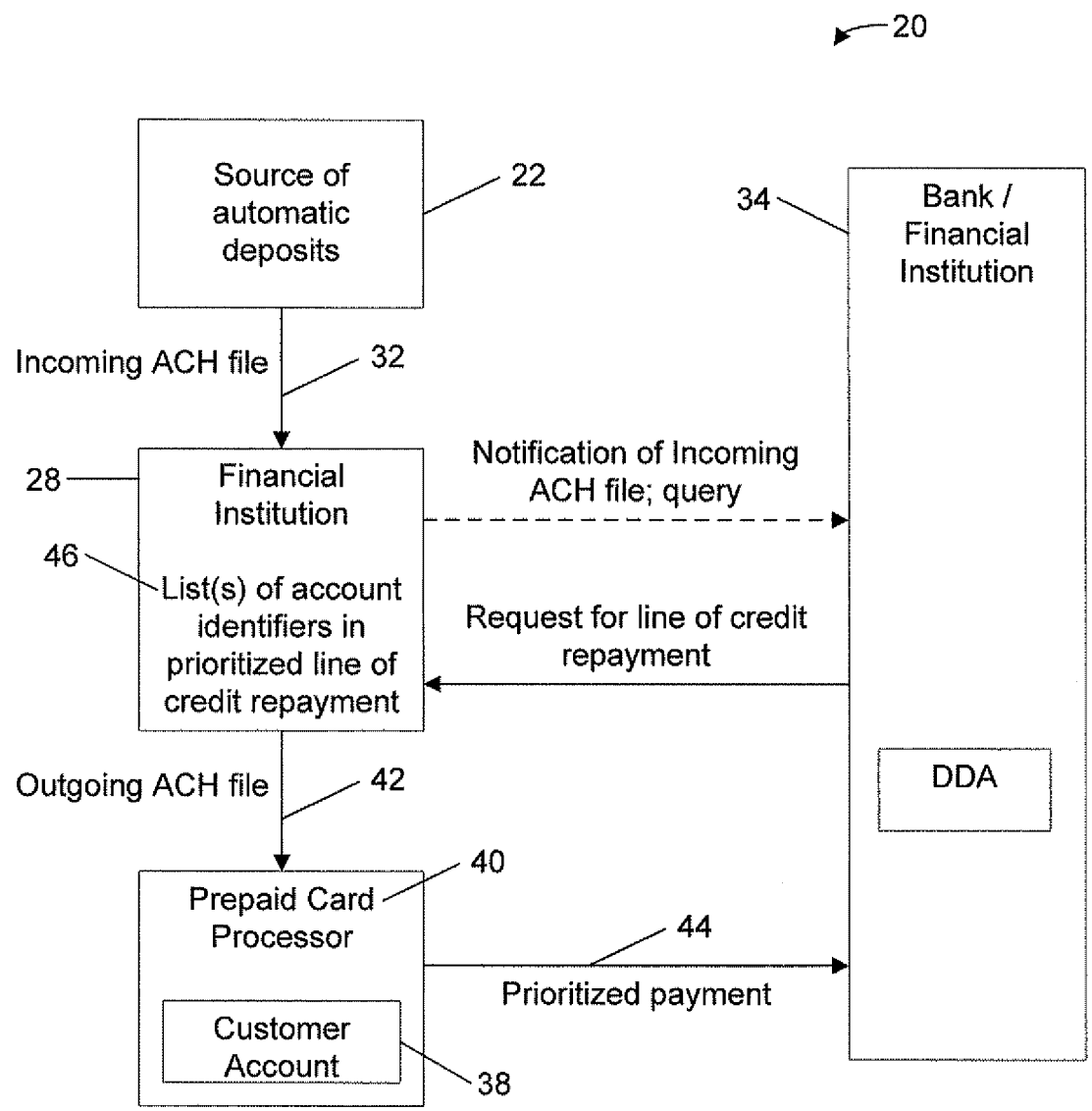
FIG. 8 is a schematic diagram of a system having a line of credit associated with a demand deposit account of a bank or financial institution for a direct deposit to an account and repayment of at least a portion of a line of credit according to an embodiment of the present invention.

Embodiments of a method can also further include determining by an online loan processor whether a customer qualifies for the line of credit responsive to the direct deposit history and prior to establishing the line of credit. The online loan processor, for example, can be accessible to the customer through the access interface and having an application program interface to the bank. As shown in FIG. 8, for example, the bank can be a first bank, and another embodiment of a method further include associating the line of credit with a demand deposit account and decrementing a designated direct deposit from the demand deposit account for repayment of at least portions of the line of credit. As will be understood by those skilled in the art, the method can also include associating the line of credit with a payroll processing entity (see, e.g., FIG. 11) and associating the line of credit with one or more prepaid cards so that usage of the one or more prepaid cards 100 occurs during the customer transaction.

As also shown in FIGS. 5-12, in an embodiment of a program product stored in one or more tangible computer readable media and readable by a computer, the program product can operates perform the following instructions when read by the computer: establishing a line of credit for a customer with a bank through an on-line access interface with the bank, determining whether access to funds through the line of credit should occur, providing only one or more preselected increments of funds, the preselected increments being less than a total available line of credit with the bank, and decrementing the total available line of credit by the one or more preselected increments and a predetermined fee amount for each of the one or more preselected increments of finds. The program product can further operate to perform the instruction of establishing a direct deposit prior to the establishing of a line of credit, the direct deposit including a direct deposit history so that determination of whether to establish a line of credit is responsive to the direct deposit history.

Embodiments of a program product can also further include instructions operating to perform the instruction of determining by an online loan processor whether a customer qualifies for the line of credit responsive to the direct deposit history and prior to establishing the line of credit. The online loan processor, for example, can be accessible to the customer through the access interface and having an application program interface to the bank. The bank can be a first bank, and the program product can further include associating the line of credit with a demand deposit account and decrementing a designated direct deposit from the demand deposit account for repayment of at least portions of the line of credit. As will be understood by those skilled in the art, the program product can also include associating the line of credit with a payroll processing entity, e.g., integrating the program product with the payroll processing program product or offering the line of credit product as a separate product to its customers, and associating the line of credit with one or more prepaid cards so that usage of the one or more prepaid cards occurs during the customer transaction. It will be also understood that in some of the embodiments of the program products, methods and systems of advancing funds, other types of cards and card products can be used as well, e.g., offering incremental micro-loans and fees with each increment through credit cards or bank account debit cards.

Embodiments of a system to advance funds to a customer, for example, can include a plurality of customer access interface devices and one or more remote computer servers positioned to provide communication with each of the plurality of customer access interface devices and being associated with a financial institution. Each of the one or more computer servers have memory, and program product is stored in the memory of the computer server so that the program product operates to perform the following instructions when read by the computer server: establishing a line of credit for a customer with the financial institution through at least one of the plurality of access interface devices with the remote computer server, the at least one access interface device being defined to provide access to a line of credit product if of the financial institution for interface with a potential customer to establish the line of credit, determining whether access to funds through the line of credit should occur for a customer transaction, initiating provision of only one or more preselected increments of funds for the customer transaction, a cumulative amount of the one or more preselected increments being less than a total available line of credit for a customer having an established line of credit with the financial institution, and decrementing the total available line of credit by the cumulative amount of the one or more preselected increments provided for the customer transaction and by a predetermined fee amount for each of the one or more preselected increments of funds. The program product can further operate to perform the instruction of establishing a direct deposit for the customer with the financial institution prior to the establishing of a line of credit. The direct deposit can include a direct deposit history so that determination of whether to establish a line of credit with the customer is responsive to the direct deposit history. The operating instructions can further include continuing to monitor the direct deposit history so that a determination of whether to change terms associated with the line of credit with the customer is made responsive to the direct deposit history.

In embodiments, the program product, for example, still further can operate to perform the following set of instructions: determining whether a customer qualifies for the line of credit responsive to the direct deposit history and prior to establishing the line of credit. As noted above, the bank can be a first bank or other financial institution 385, the program product can be further associated with a demand deposit account of a second bank 365, and the program product can further operate to perform the following instruction: decrementing a designated direct deposit from the demand deposit customer account 374, e.g., using a DDA processor 370, for repayment of at least portions of the line of credit 386 with a lending bank or other financial institution 385. For example, this can be with a list of account identifiers in prioritized line of credit repayment 366 so that the line of credit is among the list of priority payments when a source of automatic deposits 362 is received by an incoming ACH file 364 from a variety of source, such as the lending bank 385, another bank, payroll processing company, a government entity, or other third party entity 361. The DDA bank 365 can notify the lending bank 385 of an incoming ACH file or other type of query 381 and receive a request for such a line of credit to be repaid 382. The program product can be further associated with a payroll processing entity (see, e.g., FIG. 11) and can associate the line of credit with one or more prepaid cards so that usage of the one or more prepaid cards occurs during the customer transaction.

A person having ordinary skill in the art will recognize that various types of memory are readable by a computer such as described herein, e.g., underwriter computer, bank computer, computer server, prepaid card processors, line of credit processors, or other computers with embodiments of the present invention. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, memory sticks, and other newer types of memories, and transmission type media such as digital and analog communication links. For example, such media can include operating instructions, as well as instructions related to the system and the method steps described above and can operate on a computer. It will be understood by those skilled in the art that such media can be at other locations instead of or in addition to the locations described to store program products, e.g., including software, thereon. Embodiments of a system to advance funds to a customer, for example, can include a plurality of customer access interface devices as illustrated and described herein and one or more remote computer servers positioned to provide communication with each of the plurality of customer access interface devices and being associated with a financial institution. Each of these computer servers, for example, can having one or more of these various types of memory as understood by those skilled in the art.

This application claims priority to and the benefit of: U.S. Provisional Patent Application Ser. No. 61/016,213, by Sorbe et al., titled "Transfer Account Systems, Computer Program Products, and Associated Methods" filed Dec. 21, 2007; U.S. Provisional Patent Application Ser. No. 61/052,454, by Sorbe et al., titled "Transfer Account Systems, Computer Program Products, and Methods to Prioritize Payments from Preselected Bank Account" filed May 12, 2008; U.S.

Provisional Patent Application Ser. No. 61/029,975, by Sorbe et al., titled "Methods To Advance Loan Proceeds On Prepaid Cards, Associated Systems and Computer Program Products" filed on Feb. 20, 2008; U.S. Provisional Patent Application Ser. No. 61/042,612, by Ahlers et al., titled "System, Program Product, and Associated Methods To Autodraw for Micro-Credit Attached to a Prepaid Card " filed on Apr. 4, 2008; U.S. Provisional Patent Application Ser. No. 61/042,624, by Crowe et al., titled "System, Program Product, and Method To Authorize Draw for Retailer Optimization " filed on Apr. 4, 2008; U.S. Provisional Patent Application Ser. No. 61/032,750, by Ahlers et al., titled "Methods, Program Product, and System for Micro-Loan Management" filed on Feb. 29, 2008; U.S. Provisional Patent Application Ser. No. 61/060,559, by Galit et al., titled "Methods, Program Product, and System to Enhance Banking Terms Over Time" filed on Jun. 11, 2008; U.S. Provisional Patent Application Ser. No. 61/082,863, by Ahlers et al., titled "System, Program Product, and Method For Debit Card and Checking Account Autodraw" filed on Jul. 23, 2008; U.S. Provisional Patent Application Ser. No. 61/053,056, by Galit et al., titled "System, Program Product, and Method For Loading a Loan On a Pre-Paid Card" filed on May. 14, 2008, all of which are each incorporated herein by reference in their entireties. This application also relates to U.S. patent application Ser. No. 12/338,365, by Sorbe et al., titled "Transfer Account Systems, Computer Program Products, and Associated Computer-Implemented Methods" filed on the same day as this application, Dec. 18, 2008; U.S. patent application Ser. No. 12/338,402, by Sorbe et al., titled "Transfer Account Systems, Computer Program Products, and Associated Computer-Implemented Methods" filed on the same day as this application, Dec. 18, 2008; U.S. patent application Ser. No. 12/338,440, by Sorbe et al., titled "Transfer Account Systems, Computer Program Products, and Associated Computer-Implemented Methods" filed on the same day as this application, Dec. 18, 2008; U.S. patent application Ser. No. 12/338,584, by Sorbe et al., titled "Transfer Account Systems, Computer Program Products, and Computer-Implemented Methods to Prioritize Payments from Preselected Bank Account" filed on the same day as this application, Dec. 18, 2008; U.S. patent application Ser. No. 12/338,465, by Sorbe et al., titled "Transfer Account Systems, Computer Program Products, and Computer-Implemented Methods to Prioritize Payments from Preselected Bank Account" filed on the same day as this application, Dec. 18, 2008; and U.S. patent application Ser. No. 12/338,712, by Galit et al., titled "Computer-Implemented Methods, Program Product, and System to Enhance Banking Terms Over Time" filed on the same day as this application, Dec. 18, 2008, all of which are each incorporated herein by reference in their entireties.

Many modifications and other embodiments of the invention will come to the mind of one skilled in the art having the benefit of the teachings presented in the foregoing descriptions and the associated drawings. Therefore, it is to be understood that the invention is not to be limited to the illustrated embodiments disclosed, and that modifications and other embodiments are intended to be included within the scope of the appended claims.

That claimed is:

1. A lending institution computer associated with a lending institution to advance a plurality of micro-loans to a plurality of demand accounts for a plurality of customer transactions, the lending institution computer comprising:
    an input/output unit for communicating line of credit application data between a plurality of customer interface devices positioned remote from a lending institution computer;
    one or more processors; and
    non-transitory computer memory encoded with computer program operable on the lending institution computer, the computer program comprising:
    a first computer program to facilitate qualifying a plurality of demand account owners for a plurality of line of credit accounts associated with a plurality of demand accounts to thereby define an incremental line of credit qualifying module, the incremental line of credit qualifying module comprising a set of instructions, when executed by the one or more processors of the lending computer, operable to perform the operations of:
    prequalifying the plurality of demand account owners for a plurality of line of credit accounts to be associated with the plurality of demand accounts responsive to processing demand account data associated with the plurality of demand accounts;
    a second computer program to advance funds from the plurality of line of credit account in one or more of a plurality of separate predetermined loan increments to define a micro-loan dispensing module, the micro-loan dispensing module comprising a set of instructions, when executed by the one or more processors, operable to perform the operations of:
    associating a plurality of line of credit identifiers with the plurality of demand accounts responsive to the plurality of customer interface devices accepting terms of the plurality of line of credit accounts to thereby couple the plurality of demand accounts to the plurality of line of credit accounts;
    establishing the plurality of line of credit accounts at a lending institution, each of the plurality of the line of credit accounts having a plurality of separate predetermined loan increments each being equal in value and less than a total credit limit, the plurality of demand accounts each being remote from the lending institution and controlled by an institution different from the lending institution;
    determining whether to access funds from the plurality of line of credit accounts for a plurality of customer transactions responsive to a plurality of demands by the plurality of demand account owners for funds from the plurality of line of credit accounts for the plurality of customer transactions and the funds demanded being less than a line of credit balance available for each of the plurality of line of credit accounts;
    determining a number of separate predetermined loan increments to be added to the plurality of the demand accounts responsive to the determination to access funds from the plurality of line of credits for the plurality of customer transaction;
    loading the plurality of the demand accounts with at least one of the plurality of predetermined loan increments that corresponds with the number of separate predetermined loan increments to thereby define a micro-loan so that distributing the micro-loan does not exceed the line of credit balance available for each of the plurality of line of credits;

determining a total value of a predetermined loan advance fee for the micro-loan, the total value being equal to a predetermined loan advance fee multiplied by the number of separate predetermined loan increments, the total value of the predetermined loan advance fee being less than a value of the micro-loan; and decrementing the line of credit balance available for each of the plurality of line of credits by the value of the micro-loan loaded to the plurality of demand accounts.

2. A lending institution computer of claim 1, wherein the micro-loan dispensing module further comprising the operations of:

continuing to monitor the direct deposit history of each of the plurality of demand account owners so that a determination of whether to access a second micro-loan from the plurality of line of credits accounts is made responsive to the continuous monitoring.

3. A lending institution computer of claim 1, wherein the micro-loan dispensing module further comprising the operations of:

determining whether to change terms associated with each of the plurality of line of credits responsive to a direct deposit history and prior to the determination to access funds from each of the plurality of the line of credit, the determination to change terms being made after establishing the line of credit accounts.

4. A lending institution computer of claim 1, wherein the plurality of demand accounts are prepaid card accounts associated with a plurality of prepaid cards so that loading the plurality of prepaid card accounts with at least one of the plurality of predetermined loan increments enables the plurality of prepaid cards to be used for the plurality of customer transactions; and wherein the plurality of prepaid cards are controlled by a plurality of prepaid card processors positioned remote from the lending institution.

5. A lending institution computer of claim 2, wherein the micro-loan dispensing module further comprising the operations of:

automatically enhancing borrowing options for the plurality of line of credit accounts over time responsive to one or more of the following: positive repayment history; direct deposit history, and positive underwriting determination, and wherein the borrowing options include the plurality of demand account owners receiving one or more of the following: longer repayment terms, an option to repay over multiple predetermined periods, an increase in the total credit limit, and lower predetermined loan advance fee for each of the plurality of separate loan increments.

6. A lending institution computer of claim 1, wherein the computer program further includes a repayment module comprising a set of instructions operable, when executed by the lending institution computer, to perform the operations of:

repaying at least a portion of the micro-loan responsive to a direct deposit received by the lending institution for at least one of the plurality of demand account owners' benefit so that the repayment of the at least a portion of the micro-loan is deducted from the direct deposit prior to the direct deposit being available to the at least one of the plurality of demand account owners.

7. Non-transitory computer readable memory encoded with computer program operable on a computer associated with a lending institution to advance a plurality of micro-loans to a plurality of demand accounts for a plurality of customer transactions, the computer program comprising:

a first computer program to facilitate qualifying a plurality of demand account owners for a plurality of line of credit accounts associated with a plurality of demand accounts to thereby define an incremental line of credit qualifying module, the incremental line of credit qualifying module comprising a set of instructions, when executed by the one or more processors of the lending computer, operable to perform the operations of:

prequalifying the plurality of demand account owners for a plurality of line of credit accounts to be associated with the plurality of demand accounts responsive to processing demand account data associated with the plurality of demand accounts;

a second computer program to advance funds from the plurality of line of credit account in one or more of a plurality of separate predetermined loan increments to define a micro-loan dispensing module, the micro-loan dispensing module comprising a set of instructions, when executed by the one or more processors, operable to perform the operations of:

associating a plurality of line of credit identifiers with the plurality of demand accounts responsive to the plurality of customer interface devices accepting terms of the plurality of line of credit accounts to thereby couple the plurality of demand accounts to the plurality of line of credit accounts;

establishing the plurality of line of credit accounts at a lending institution, each of the plurality of the line of credit accounts having a plurality of separate predetermined loan increments each being equal in value and less than a total credit limit, the plurality of demand accounts each being remote from the lending institution and controlled by an institution different from the lending institution;

determining whether to access funds from the plurality of line of credit accounts for a plurality of customer transactions responsive to a plurality of demands by the plurality of demand account owners for funds from the plurality of line of credit accounts for the plurality of customer transactions and the funds demanded being less than a line of credit balance available for each of the plurality of line of credit accounts;

determining a number of separate predetermined loan increments to be added to the plurality of the demand accounts responsive to the determination to access funds from the plurality of line of credits for the plurality of customer transaction;

loading the plurality of the demand accounts with at least one of the plurality of predetermined loan increments that corresponds with the number of separate predetermined loan increments to thereby define a micro-loan so that distributing the micro-loan does not exceed the line of credit balance available for each of the plurality of line of credits;

determining a total value of a predetermined loan advance fee for the micro-loan, the total value being equal to a predetermined loan advance fee multiplied by the number of separate predetermined loan increments, the total value of the predetermined loan advance fee being less than a value of the micro-loan; and decrementing the line of credit balance available for each of the plurality of line of credits by the value of the micro-loan loaded to the plurality of demand accounts.

8. Non-transitory memory as define in claim 7, wherein the micro-loan dispensing module further comprising the operations of:

continuing to monitor the direct deposit history of each of the plurality of demand account owners so that a determination of whether to access a second micro-loan from the plurality of line of credits accounts is made responsive to the continuous monitoring.

9. Non-transitory memory as define in claim 7, wherein the micro-loan dispensing module further comprising the operations of:

determining whether to change terms associated with each of the plurality of line of credits responsive to a direct deposit history and prior to the determination to access funds from each of the plurality of the line of credit, the determination to change terms being made after establishing the line of credit accounts.

10. Non-transitory memory as define of claim 7, wherein the plurality of demand accounts are prepaid card accounts associated with a plurality of prepaid cards so that loading the plurality of prepaid card accounts with at least one of the plurality of predetermined loan increments enables the plurality of prepaid cards to be used for the plurality of customer transactions; and wherein the plurality of prepaid cards are controlled by a plurality of prepaid card processors positioned remote from the lending institution.

11. Non-transitory memory as define in claim 8, wherein the micro-loan dispensing module further comprising the operations of:

automatically enhancing borrowing options for the plurality of line of credit accounts over time responsive to one or more of the following: positive repayment history, direct deposit history, and positive underwriting determination, and wherein the borrowing options include the plurality of demand account owners receiving one or more of the following: longer repayment terms, an option to repay over multiple predetermined periods, an increase in the total credit limit, and lower predetermined loan advance fee for each of the plurality of separate loan increments.

12. Non-transitory memory as define in claim 7, wherein the computer program further includes a repayment module comprising a set of instructions operable, when executed by the lending institution computer, to perform the operations of:

repaying at least a portion of the micro-loan responsive to a direct deposit received by the lending institution for at least one of the plurality of demand account owners' benefit so that the repayment of the at least a portion of the micro-loan is deducted from the direct deposit prior to the direct deposit being available to the at least one of the plurality of demand account owners.

13. A computer-implemented method to advance a plurality of micro-loans to a plurality of demand accounts for a plurality of customer transactions, the method comprising:

prequalifying, by a computer associated with a lending institution to define a lending institution computer, the plurality of demand account owners for a plurality of line of credit accounts to be associated with the plurality of demand accounts responsive to processing demand account data associated with the plurality of demand accounts;

associating, by the lending institution computer, a plurality of line of credit identifiers with the plurality of demand accounts responsive to the plurality of customer interface devices accepting terms of the plurality of line of credit accounts to thereby couple the plurality of demand accounts to the plurality of line of credit accounts;

establishing, by the lending institution computer, the plurality of line of credit accounts at a lending institution, each of the plurality of the line of credit accounts having a plurality of separate predetermined loan increments each being equal in value and less than a total credit limit, the plurality of demand accounts each being remote from the lending institution and controlled by an institution different from the lending institution;

determining, by the lending institution computer, whether to access funds from the plurality of line of credit accounts for a plurality of customer transactions responsive to a plurality of demands by the plurality of demand account owners for funds from the plurality of line of credit accounts for the plurality of customer transactions and the funds demanded being less than a line of credit balance available for each of the plurality of line of credit accounts;

determining, by the lending institution computer, a number of separate predetermined loan increments to be added to the plurality of the demand accounts responsive to the determination to access funds from the plurality of line of credits for the plurality of customer transaction;

loading, by the lending institution computer, the plurality of the demand accounts with at least one of the plurality of predetermined loan increments that corresponds with the number of separate predetermined loan increments to thereby define a micro-loan so that distributing the micro-loan does not exceed the line of credit balance available for each of the plurality of line of credits;

determining, by the lending institution computer, a total value of a predetermined loan advance fee for the micro-loan, the total value being equal to a predetermined loan advance fee multiplied by the number of separate predetermined loan increments, the total value of the predetermined loan advance fee being less than a value of the micro-loan; and decrementing, by the lending institution computer, the line of credit balance available for each of the plurality of line of credits by the value of the micro-loan loaded to the plurality of demand accounts.

14. A computer-implemented method as define in claim 13, the method further includes:

continuing to monitor the direct deposit history of each of the plurality of demand account owners so that a determination of whether to access a second micro-loan from the plurality of line of credits accounts is made responsive to the continuous monitoring.

15. A computer-implemented method as define in claim 13, the method further includes:

determining whether to change terms associated with each of the plurality of line of credits responsive to a direct deposit history and prior to the determination to access funds from each of the plurality of the line of credit, the determination to change terms being made after establishing the line of credit accounts.

16. A computer-implemented method as define in claim 13, wherein the plurality of demand accounts are prepaid card accounts associated with a plurality of prepaid cards so that loading the plurality of prepaid card accounts with at least one of the plurality of predetermined loan increments enables the plurality of prepaid cards to be used for the plurality of customer transactions; and wherein the plurality of prepaid cards are controlled by a plurality of prepaid card processors positioned remote from the lending institution.

17. A computer-implemented method as define in claim 14, the method further includes:

automatically enhancing borrowing options for the plurality of line of credit accounts over time responsive to one or more of the following: positive repayment history, direct deposit history, and positive underwriting determination, and wherein the borrowing options include the plurality of demand account owners receiving one or more of the following: longer repayment terms, an option to repay over multiple predetermined periods, an increase in the total credit limit, and lower predetermined loan advance fee for each of the plurality of separate loan increments.

18. A computer-implemented method as define in claim 13, wherein the method further includes:

repaying, by the lending institution computer, at least a portion of the micro-loan responsive to a direct deposit received by the lending institution for at least one of the plurality of demand account owners' benefit so that the repayment of the at least a portion of the micro-loan is deducted from the direct deposit prior to the direct deposit being available to the at least one of the plurality of demand account owners.

19. A computer-implemented method as define in claim 13, wherein the method further includes:

decrementing, by the lending institution computer, a designated direct deposit received by the plurality of demand deposit accounts for repayment for at least a portion of the micro-loan.

20. A computer-implemented method as define in claim 13, wherein the plurality of demand accounts are prepaid card accounts associated with a plurality of prepaid cards so that loading the plurality of prepaid card accounts with at least one of the plurality of predetermined loan increments enables the plurality of prepaid cards to be used for the plurality of customer transactions; wherein the plurality of prepaid cards are controlled by a plurality of prepaid card processors positioned remote from the lending institution; and the method further includes:

continuing to monitor the direct deposit history of each of the plurality of prepaid card accounts so that a determination of whether to access a second micro-loan from the plurality of line of credits accounts is made responsive to the continuous monitoring.

\* \* \* \* \*